United States Patent
Que et al.

(10) Patent No.: US 6,377,718 B1
(45) Date of Patent: Apr. 23, 2002

(54) MICROMECHANICAL PHASE-SHIFTING GATE OPTICAL MODULATOR

(75) Inventors: Long Que; Gunawan Witjaksono; Yogesh B. Gianchandani, all of Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/535,312

(22) Filed: Mar. 24, 2000

(51) Int. Cl.$^7$ ............................................... G02F 1/035
(52) U.S. Cl. ............................................................ 385/3
(58) Field of Search ................................. 385/3–8, 147, 385/37; 359/321, 248, 245, 563, 586, 589, 247; 250/581, 582; 372/96

(56) References Cited

U.S. PATENT DOCUMENTS

| | | | |
|---|---|---|---|
| 4,567,451 A | | 1/1986 | Greenwood .................. 331/155 |
| 4,772,786 A | | 9/1988 | Langdon .................. 250/231 R |
| 5,090,254 A | | 2/1992 | Guckel et al. ............ 73/862.59 |
| 5,337,183 A | * | 8/1994 | Rosenblatt .................. 359/248 |
| 5,654,819 A | | 8/1997 | Goossen et al. |
| 5,808,384 A | | 9/1998 | Tabat et al. ........... 310/40 MM |
| 5,831,262 A | | 11/1998 | Greywall et al. |
| 5,864,146 A | * | 1/1999 | Karellas ...................... 250/581 |
| 6,268,953 B1 | * | 7/2001 | Maloney ..................... 359/321 |

FOREIGN PATENT DOCUMENTS

| | | |
|---|---|---|
| EP | 0 935 149 A | 11/1999 |
| JP | 59 093404 A | 5/1984 |

OTHER PUBLICATIONS

J.A. Walker, et al., "Silicon Optical Modulator with 5 MHz Operation for Fiber–in–the–Loop Applications," Transducers '95–Eurosensors IX, Stockholm, Sweden, Jun. 25–29, 1995, pp. 285–288.

C. Marxer, et al., "MHz Opto–Mechanical Modulator," Transducers '95–Eurosensors IX, Stockholm, Sweden, Jun. 25–29, 1995, pp. 289–292.

C. Marxer, et al., "Vertical Mirrors Fabricated by Reactive Ion Etching for Fiber Optical Switching Applications," IEEE Int. Conf. on MEMS '97, 1997, pp. 49–54.

(List continued on next page.)

*Primary Examiner*—Akm E. Ullah
(74) *Attorney, Agent, or Firm*—Foley & Lardner

(57) ABSTRACT

A micromechanical optical modulator includes an input optical waveguide that projects a beam across a gap to an output optical waveguide. A phase shifting gate is mounted between the input and output optical waveguides and has a light transmissive panel which may have at least two sections of different thicknesses. The phase shifting gate is translatable between a position in which the beam of light is transmitted and a second position in which a section of the gate panel is interposed in the beam path and the beam of light is reflected by interference effects. A micromechanical actuator may be connected to the phase shifting gate to switch it between its positions. The optical waveguides may be mounted at an angle to the surfaces of the sections of the gate such that when the beam is reflected from the gate it is directed to a second output optical waveguide, which receives the beam and directs it on a new path, thereby allowing switching of optical beam paths in an optical communication system. The optical modulator may also be used as a sensor to detect effects which displace the phase shifting gate, such as in an accelerometer in which a mass is connected to the gate to move the gate when the mass is subjected to accelerations.

56 Claims, 15 Drawing Sheets

OTHER PUBLICATIONS

Shi–Sheng Lee, et al., "Surface–Micromachined Free–Space Fiber Optic Switches with Integrated Microactuators for Optical Fiber Communication Systems," Transducers '97, Chicago, IL, Jun. 16–19, 1997, pp. 85–88.

R.A. Miller, et al., "An Electromagnetic MEMS 2×2 Fiber Optic Bypass Switch," Transducers '97, Chicago, IL, Jun. 16–19, 1997, pp. 89–92.

D.S. Greywall, "Micromechanical Light Modulators, Pressure Gauges, and Thermometers Attached to Optical Fibers," J. Micromech. Microeng., vol. 7, 1997, pp. 343–352.

M. Mita, et al., "Optical and Surface Characterization of Poly–Si Replica Mirrors for an Optical Fiber Switch," Transducers '99, Sendai, Japan, Jun. 7–10, 1999, pp. 332–335.

J.S. Park, et al., "Long Throw and Rotary Output Electro-Thermal Actuators Based on Bent–Beam Suspensions," IEEE Int. Conf. on Micro Electro Mechanical Systems (MEMS '00), Miyazaki, Japan, Jan., 2000.

* cited by examiner

MICROMECHANICAL PHASE-SHIFTING GATE OPTICAL MODULATOR

This invention was made with United States government support awarded by the following agency: NSF Grant NO: ECS-9820969. The United States has certain rights in this invention.

FIELD OF THE INVENTION

This invention pertains generally to the field of optics and optical communication systems and particularly to optical modulators for fiber optic communication systems.

BACKGROUND OF THE INVENTION

The utilization of optical fiber in communication networks is growing rapidly. Such networks require highly reliable and preferably low-cost optical switching and modulation devices. To achieve higher reliability and lower cost, substantial efforts have been made to produce optical switching devices using microelectromechanical system (MEMS) techniques. See, e.g., W. H. Juan, et al., "High aspect ratio Si vertical micromirror array for optical switch," *J. Microelectromech Syst.*, Vol. (17), Nov. 2, 1998, pp. 207–213; Makoto Mita, et al., "Optical and surface characterization of poly-Si replica mirrors for an optical fiber switch," *Transducers '99*, pp. 332–335; S. S. Lee, et al., "Surface-micromachined free-space fiber optic switches with integrated microactuators for optical fiber communication system," *Transducers '97*, pp. 85–88; A. Miller, et al., "An electromagnetic MEMS 2×2 fiber optic bypass switch," *Transducers '97*, pp. 89–92; C. Marxer, et al., "Vertical mirrors fabricated by reactive ion etching for fiber optical switch applications," *IEEE Int. Conf. On MEMS '97*, pp. 49–54.

The most common switching elements used in present MEMS optical switching networks are micromirrors. A significant challenge in the production of MEMS micromirrors is the achievement of sufficiently high reflectivity and smoothness of the mirror surfaces. The best reflectivity that apparently has been reported to date for MEMS micromirrors has been about 85% (−0.71 dB), which is achieved by coating gold on a silicon mirror. The roughness of the mirror is about 5 nm with proper fabrication processes. See, W. H. Juan, et al., supra. The use of mirrors in micro-optical systems presents particular problems for planar systems in which the light travels parallel to the plane of the substrate. Planar systems are desirable because they offer the highest potential level of integration by allowing an entire optical bench to be implemented on a single semiconductor chip. However, the use of mirrors as the optical switching elements requires that these optical elements must either be bulk micromachined into the silicon substrate, or be surface micromachined from deposited thin films which then must be flipped up.

SUMMARY OF THE INVENTION

In accordance with the present invention, a micromechanical optical modulator can be constructed by standard MEMS batch fabrication techniques on conventional planar substrates, enabling relatively low cost production and high reliability. The optical modulators may be utilized in optical communication systems for purposes such as on/off switches, routing switches, switched modulators and in various types of sensors, such as accelerometers. Optical switching devices embodying the invention may be incorporated in a communication system with low insertion loss and rapid switching times that are comparable to or better than conventional switching elements now used in fiber optic communication systems.

The micromechanical optical modulator of the invention may incorporate an input optical waveguide with an exit face from which a light beam can exit the waveguide, and an output optical waveguide with an entrance face spaced from the exit face of the input optical waveguide to receive a light beam exiting from the exit face on a beam path. Such optical waveguides can include, but are not limited to, optical fibers of the type utilized in fiber optic communication systems. A phase shifting gate is mounted between the input optical waveguide and the output optical waveguide. The phase shifting gate includes a light transmissive panel and can be moved between at least two positions. The light transmissive panel has at least one section having outer surfaces. The light transmissive panel may have two (or more) sections with one thicker section having a thickness greater than that of another thinner section. The phase shifting gate is translatable between at least two positions. For a panel having two sections, in one position the thinner section is interposed in the beam path between the input and output optical waveguides, whereas in the other position of the gate, the thicker section is interposed in the beam path. For a panel having a single section, the panel is interposed in the beam path in one position and out of the beam path in another position. The spacing between the exit face of the input optical waveguide and the adjacent surfaces of the sections of the panel, the spacing between the entrance face of the output optical waveguide and the adjacent surfaces of the sections of the panel, and the index of refraction of the light transmissive panel are selected such that, for a selected wavelength of light in the beam, in one of the positions of the gate the beam is transmitted through or past the section of the panel and in a second position of the gate the light in the beam is substantially reflected by interference effects.

An actuator may be connected to the phase shifting gate to drive it between its two positions. A micromechanical spring may be mounted to a substrate and connected to the gate to support the gate for lateral motion and to resiliently bias the gate back to an initial position. The gate may thus be switched from a position in which it transmits the light beam from the input optical waveguide to the output optical waveguide to the second position to block the beam, thereby effectively acting as an on/off switch. The switch can be actuated rapidly to provide pulsed on and off switching of the beam. In addition, as the gate transition region—at which the thicker section and the thinner section of the panel meet—enters and progressively moves across the width of the beam between the input and output optical waveguides, the intensity of the transmitted beam will be progressively reduced or increased, depending on the direction of travel of the gate. Thus, very precise sensing of the position of the gate can be obtained by detecting the intensity of the transmitted beam. The optical modulator of the invention may thus be incorporated in microsensors such as pressure sensors (with the gate connected to a diaphragm that deflects with pressure changes), strain sensors, and accelerometers. An accelerometer may be formed by connecting a proof mass to a phase shifting gate supported by a spring so that the gate is displaced by the force exerted by the proof mass during accelerations.

The optical modulator of the invention may also be incorporated in communication systems to redirect light beams, utilizing input and output optical waveguides that are oriented at a non-perpendicular angle to the surfaces of the light transmissive panel of the phase shifting gate. In one of the positions of the gate the panel is out of the beam path or a first section of the panel is in a beam path from a first input optical waveguide to the entrance face of a first output optical waveguide on the other side of the gate, providing a continuous beam transmission path from the first input optical waveguide to the first output optical waveguide. In a second position of the gate the panel or a panel section of different thickness than the first section is interposed in the beam between the first input and output optical waveguides such that the light in the beam is reflected by interference effects and is directed to the entrance face of a second output optical waveguide, completing a redirected transmission path from the first input optical waveguide to the second output optical waveguide, and blocking transmission to the first output optical waveguide. A second input optical waveguide may be mounted to transmit light through a first section of the panel to the second output optical waveguide in the first position of the gate, and to have the light in the beam reflected by the panel in the second position of the gate to the first output optical waveguide, thus completing a new light transmission path between the second input optical waveguide to the first output optical waveguide.

Various materials are suitable for the light transmissive gate. Crystalline silicon, for example, is well suited for transmission of light in the infrared wavelengths commonly used for optical communication systems. A wavelength of light commonly used in optical communications is 1.55 μm, at which silicon is essentially transparent. Such micromechanical silicon gates can be readily constructed by well developed MEMS processing techniques for silicon microstructures. No additional surface finishing or coating steps (such as gold coating) are required, as is typically the case with micromirrors.

Further objects, features and advantages of the invention will be apparent from the following detailed description when taken in conjunction with the accompanying drawings.

DETAILED DESCRIPTION OF THE INVENTION

The micromechanical optical modulator of the present invention utilizes a phase-shifting gate which can be driven by a microactuator integrated on the same chip (substrate) with the gate. The gate alters the phase of propagated light in the optical system and consequently modulates light by optical interference effects. For a chosen nominal wavelength of light, the optical modulator of the invention can be optimized to obtain a minimum reflectivity of essentially zero and a maximum reflectivity on the order of 99.5%. The use of a phase-shifting gate in accordance with the invention instead of a conventional micromirror simplifies the gate fabrication process. For example, in the present invention, there is no need for evaporation of gold onto a mirror surface to improve reflectivity. In the modulator of the invention, the coupling distance between input and output waveguides can be reduced to less than 40 μm, with waveguide alignment readily obtained by the use of guiding grooves which can be produced by standard micromachining processes. The scattering of incident light by the phase-shifting gate can be minimized because the roughness of the sidewall of the gate can be reduced to several nanometers, while the wavelength of light used in optical communication is generally 1.3 μm or 1.55 μm, about 2 orders of magnitude larger than the surface roughness.

Figure 1:
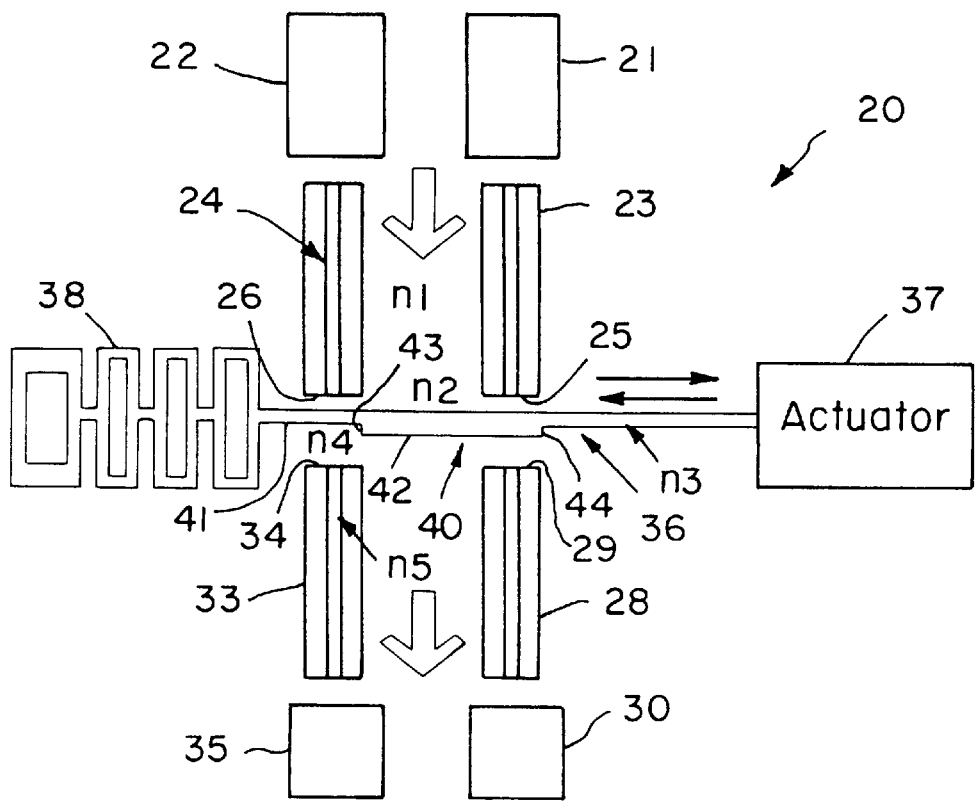
FIG. 1 is a simplified plan view of a micromechanical optical modulator in accordance with the invention.

For purpose of exemplifying the invention, a simplified diagram of a micromechanical optical modulator in accordance with the invention that may be used in an optical communications system is shown generally at 20 in FIG. 1. Optical communications sources 21 and 22, e.g., internally or externally modulated laser diodes, LEDs, etc., provide optically modulated light at a carrier wavelength to input optical waveguides 23 and 24, respectively. The waveguides 23 and 24 may comprise, for example, conventional optical fibers of the type used in communication systems. The waveguide 23 has an exit face 25 and the waveguide 24 has an exit face 26. An output optical waveguide 28 extends from an entrance face 29 to a receiving device 30 (which may be a detector or, e.g., a further optical communications network). The entrance face 29 of the waveguide 28 faces the exit face 25 across a spacing or gap. Similarly, an output optical waveguide 33 extends from an entrance face 34 to a utilization device 35, with the entrance face 34 facing the exit face 26 of the waveguide 24 across a gap. It is understood that the positions of the sources and utilization devices may be interchanged so that light travels in the adjacent parallel waveguides in opposite directions, or the waveguides 28 and 33 may be joined (or unitary) so that the light beam is transmitted from, e.g., the device 21 to the device 22.

In accordance with the invention, a phase-shifting gate 36 is mounted in the gap between the input and output optical waveguides and is driven in lateral motion with respect to the light beam paths between the exit faces 25 and 26 and the entrance faces 29 and 34, respectively, by an actuator 37. In the optical modulator 20 of FIG. 1, the beam paths between the pairs of input and output optical waveguides 23 and 28, and 24 and 33, respectively, are parallel to one another, and the gate 36 is mounted (e.g., to a substrate) for lateral motion perpendicular to the light beams. A spring 38 may be mounted to the gate 36 to bias it back to an initial position when the actuator 37 does not drive the gate. The gate includes a light transmissive panel 40 having two sections of different thicknesses, a first thinner section 41 and a second thicker section 42. The thicker section has terminal edges 43 and 44, defining a transition at which the thickness of the panel transitions immediately to that of the thinner panel section 41. If desired for some types of applications, the transition region may be a gradual rather than abrupt transition. The width and position of the thicker section 42 of the panel is selected such that when the gate moves from the right to left, or vice versa, under the action of the actuator 37, the optical transmission path through the gate from input waveguide 23 to the output waveguide 28 and from the input waveguide 24 to the output waveguide 33 changes from thicker section to thinner section or thinner section to thicker section, modulating the light transmitted through the panel due to constructive or destructive optical interference effects. By proper selection of the thicknesses of the two (or more) sections 41 and 42, and the spacing between the exit and entrance faces and the adjacent outer surfaces of the sections 41 and 42 gate panel, given a chosen wavelength of the light transmitted by the optical waveguides, substantially complete transmission or substantially complete blockage of light between the input and output waveguides can be obtained in the two switched positions of the gate.

Figure 2:
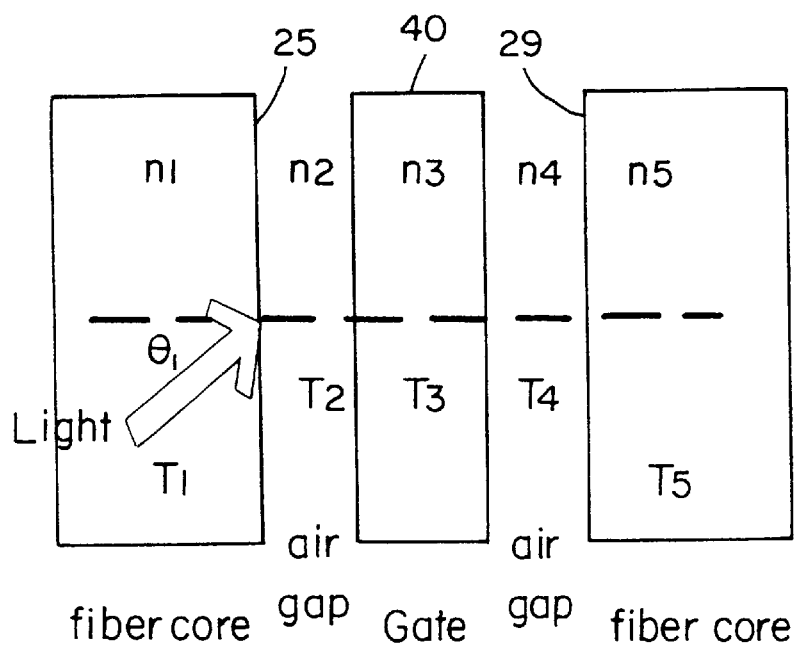
FIG. 2 is a diagram illustrating the various optical layers of the micromechanical modulator of the invention.

The physical basis for the operation of the gate in accordance with the invention can be understood with reference to the model optical system having the layered structure shown in FIG. 2. $T_2$ and $T_4$ are the thicknesses of the air gaps between the exit and entrance faces and the adjacent outer surfaces of the panel section, $T_3$ is the thickness of a panel section (i.e., either the thicker or thinner section) of the phase-shifting gate, and $n_1(n_5)$, $n_2(n_4)$, $n_3$ are the optical refraction indices of the optical waveguide cores, air, and the gate panel, respectively (generally, $n_2 = n_4 = n_{air}$ for air gaps). Assume the light from the waveguide is incident at an angle of $\theta_1$ to the air gap layer (as illustrated in FIG. 2), so the characteristic matrix of the optical system is given by:

$$M = \begin{pmatrix} \cos\beta_2 & -i/n_2\sin\beta_2 \\ -in_2\sin\beta_2 & \cos\beta_2 \end{pmatrix} \times$$

$$\begin{pmatrix} \cos\beta_2 & -i/n_3\sin\beta_3 \\ -in_3\sin\beta_3 & \cos\beta_3 \end{pmatrix} \times \begin{pmatrix} \cos\beta_4 & -i/n_4\sin\beta_4 \\ -in_4\sin\beta_4 & \cos\beta_4 \end{pmatrix}$$

and the relative reflectivity R of the optical system is given by:

$$R = \left| \frac{(M_{11} + M_{12}P_5)P_1 - (M_{21} + M_{22}P_1)}{(M_{11} + M_{12}P_5)P_1 + (M_{21} + M_{22}P_1)} \right|^2$$

where $\beta_i = 2\pi/\lambda_0 n_i T_i \cos\theta_1$ (i=2,3,4), $P_i = n_i \cos\theta_i$ (i=1,5), and $\theta_i$ is the refraction angle in a media with refractive index of $n_i$ (i=1,2,3,4,5).

In the following example, it is assumed that the light wavelength $\lambda_0 = 1.55$ μm and $\theta_1 = 0$ radian. The design of the system is successful if parameters $T_2^*$, $T_3^*$, and $T_4^*$ are found, for a selected wavelength of light in the beam (in this example, $\lambda_0 = 1.55$ μm), such that the relative reflectivity is equal to zero or is equal to unity with a prescribed accuracy, i.e.,:

$$R(T_2^*, T_3^*, T_4^8, \theta_1) = 0$$

or $$R(T_2^*, T_3^*, T_4^*, \theta_1) \approx 1$$

This is a multi-objective optimization problem. A Matlab™ program may be developed to solve this problem using ATTGOAL routine for the optimization. Like most optimization procedures, this algorithm relies on the starting values of optimization parameters, $T_2^0$, $T_3^0$, and $T_4^0$. A proper choice of their values can reduce the computation time. For example, taking the starting values to be $T_2^0 = T_4^0 = 20$ μm, and $T_3^0 = 5$ μm, and the required accuracy as $10^{-4}$, for zero reflectivity the optimized design parameters will be $T_2^* = T_4^* = 20.09$ μm and $T_3^* = 5.30$ μm, while for maximum reflectivity the optimized design parameters will be $T_2^* = T_4^* = 19.76$ μm, and $T_3^* = 4.98$ μm.

The algorithm outlined above has applicability for generalized multilayer optics. For the specific example of FIG. 2, it provides the intuitively obvious result that the reflectivity is maximum when $T_2$ and $T_4$ are odd multiples of $\lambda_0/4n_2$ (i.e., $\lambda_0/4n_{air}$ where $n_{air}$ is the index of refraction of air), and $T_3$ is an odd multiple of $\lambda_0/4n_3$ (i.e., $\lambda_0/4n_g$ where $n_g$ is the index of refraction of the gate panel material). Additionally, the reflectivity is zero when $T_3$ is an even multiple of $\lambda_0/4n_3$ (i.e., $\lambda_0/4n_g$). The analytical formula for these specific conditions can be obtained from the equations above as:

$$R = \left| \frac{i\left(\frac{n_1^2 n_3}{n_2^2} - \frac{n_2^2}{n_3}\right)\sin\beta_3}{-2n_1\cos\beta_3 + i\left(\frac{n_1^2 n_3}{n_2^2} + \frac{n_2^2}{n_3}\right)\sin\beta_3} \right|^2$$

Figure 3:
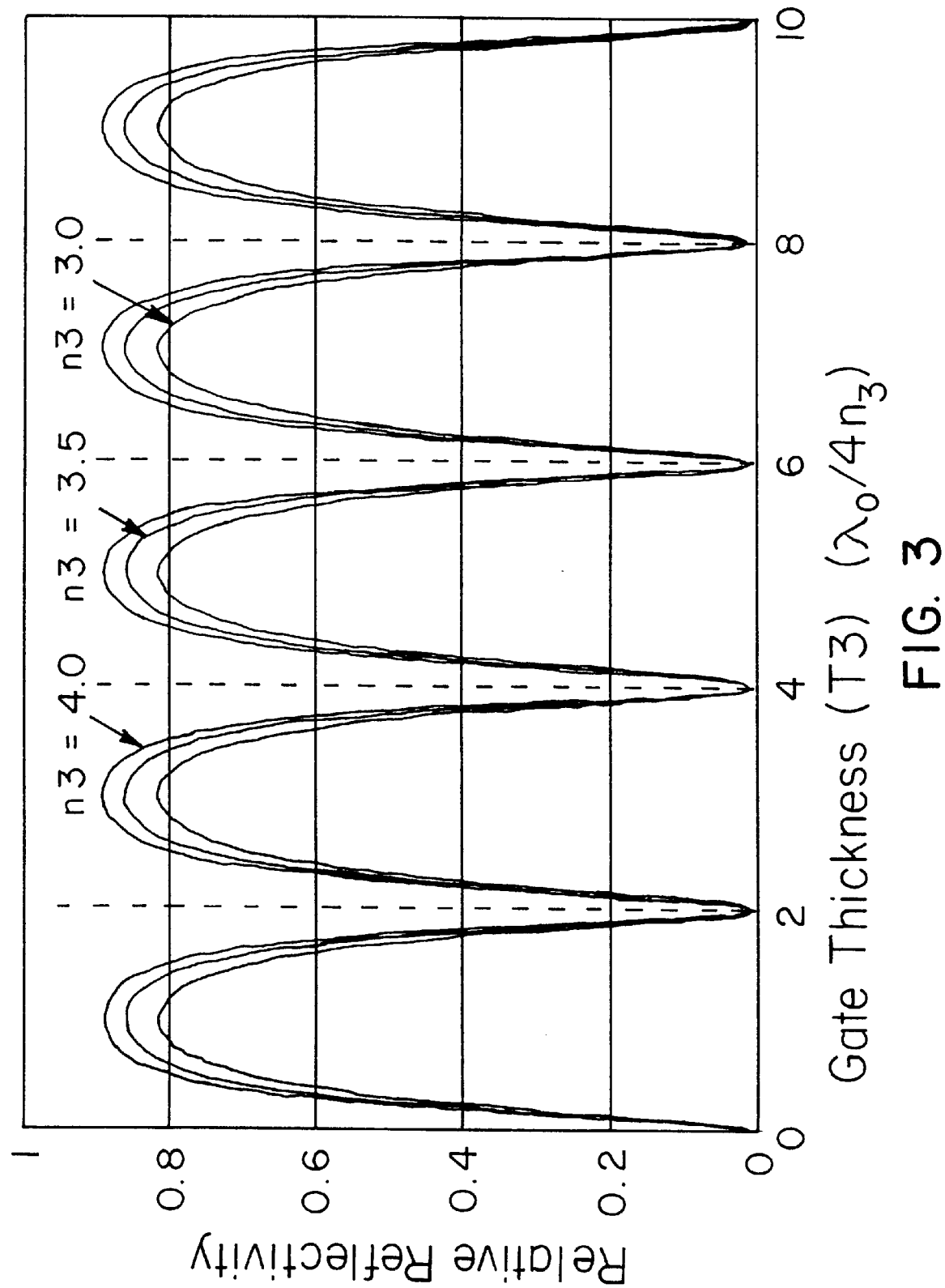
FIG. 3 are graphs illustrating the modulating properties of the layered optical system as a function of the thickness of the panel sections of the gate through which the beam passes.

The reflectivity versus the gate thickness (in units of $\lambda/4n_3$) based on the foregoing equation is shown in FIG. 3. This figure illustrates that the light beam can be modulated by the thickness of the gate panel for the specific dimensional designs.

The modulation efficiency can be improved by enhancing the interface between the waveguides and the air gap. FIG.

Figure 5:
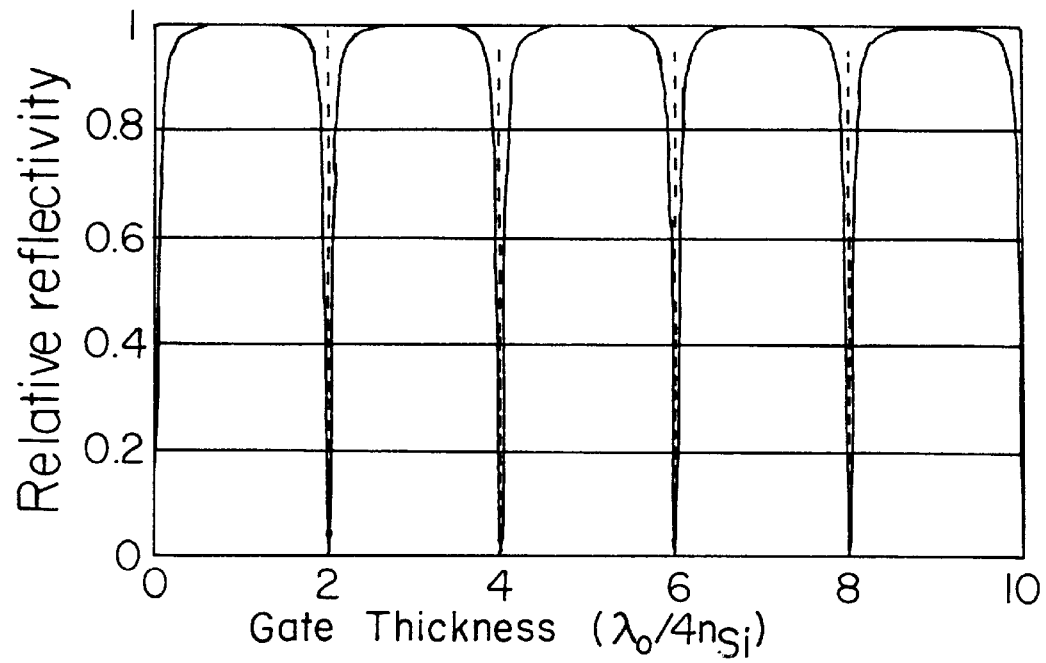
FIG. 5 is a graph similar to that of FIG. 3 showing the modulating properties of the layered optical system of FIG. 4.

4 shows light transmissive interface silicon plates 50 and 51 integrated to the waveguides 23 and 24, and 28 and 33, respectively, to improve the modulation efficiency as well as to assist assembly of the optical waveguides. The plates 50 and 51 may, if desired, be secured to the faces of the waveguides with a glue which matches the index of the waveguide core. FIG. 5 gives the modulation properties of this system with a silicon gate, showing that 99.5% modulation and 23 dB contrast ratio can be achieved when the thickness of the silicon plates 50 and 51 is designed to be an odd multiple of $\lambda_0/4n_{silicon}$ and the air gaps are also odd multiple of $\lambda_0/4n_{air}$.

Figure 4:
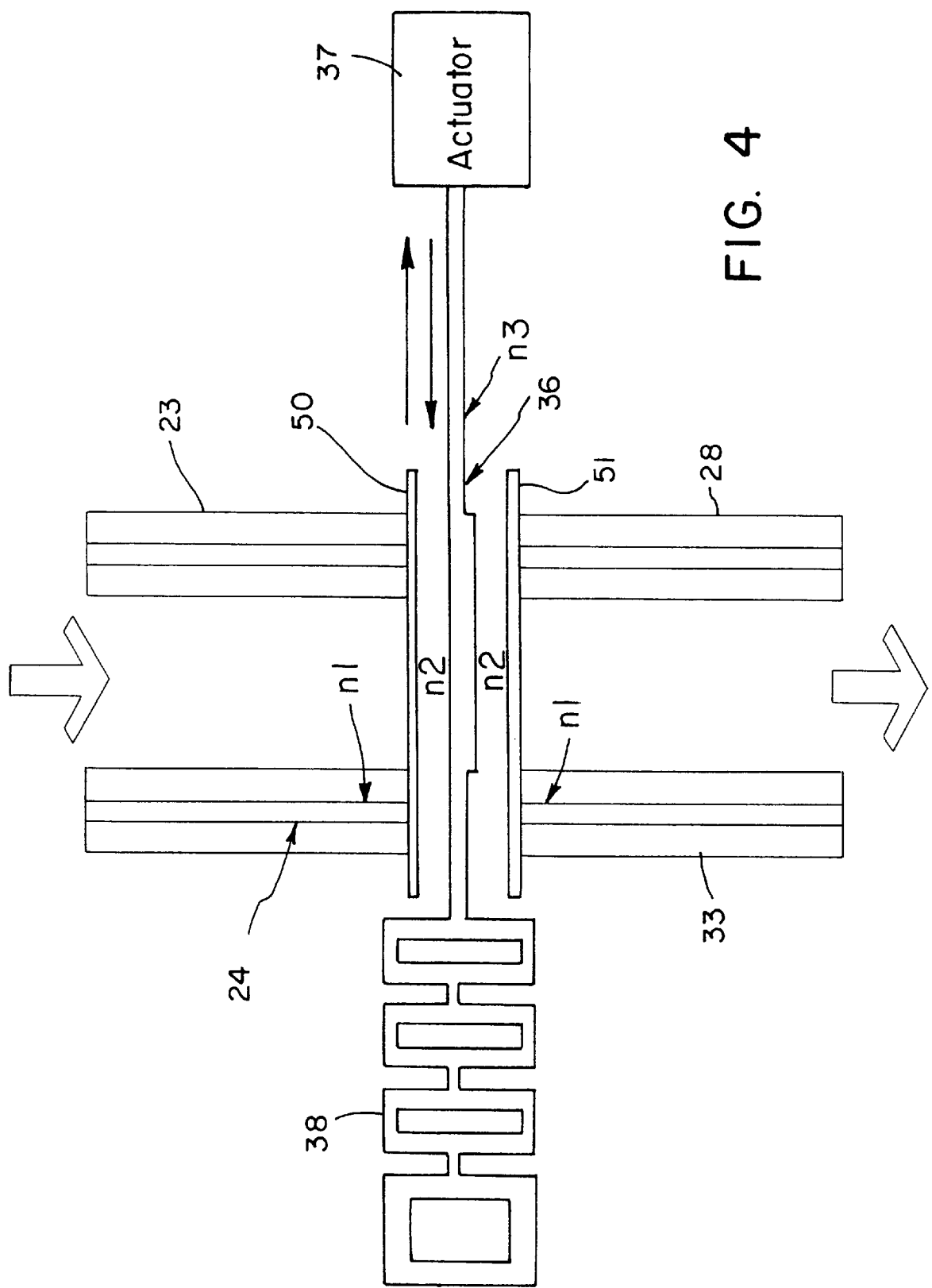
FIG. 4 is a schematic plan view of a modified embodiment of a micromechanical optical modulator in accordance with the invention.
Figure 6:
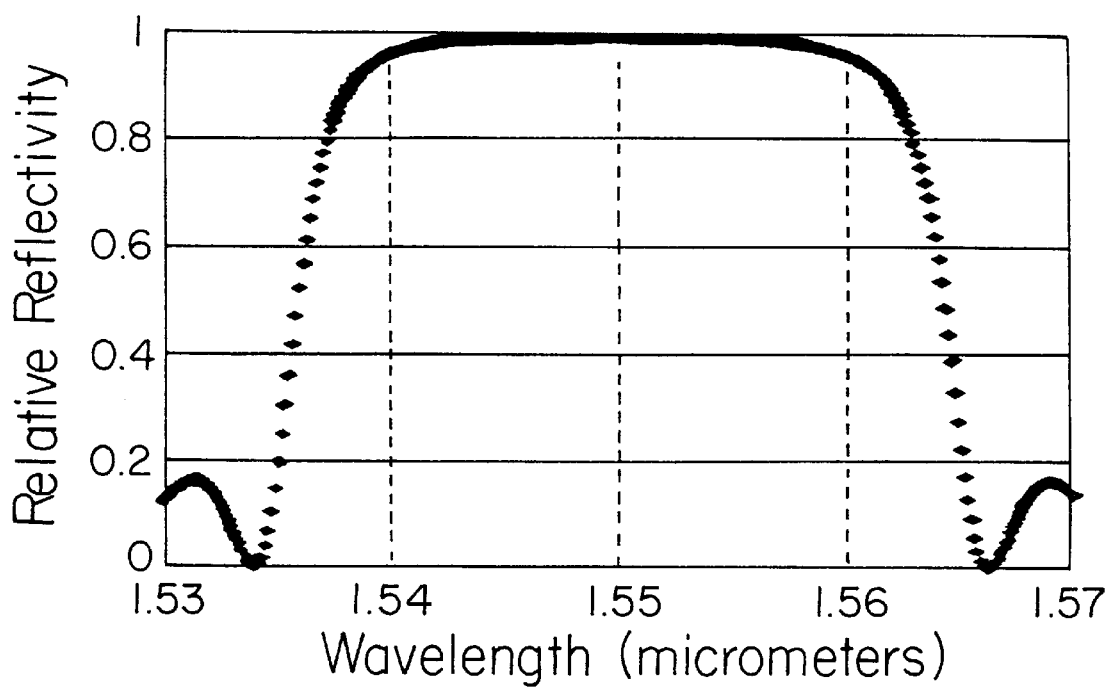
FIG. 6 is a plot of relative reflectivity versus wavelengths showing the reflectance wavelength dependencies for the optical system of FIG. 4 for a light beam centered at 1.55 μm.

The effect of quasi-monochromatic light was analyzed for the optical system of FIG. 4 at maximum reflectivity, with $T_{plate}$=5.64 μm, $T_{gate}$=4.98 μm and $T_{air}$=19.76 μm. As shown in FIG. 6, even when the light at $\lambda_0$=1.55 μm has a 0.02 μm distribution, the reflectivity remains almost unchanged. Beyond this bandwidth, the system shows strong optical filter characteristics. The substantially flat reflectivity within the passband thus enables reflection of modulated carrier beams utilizing the optical modulator of the invention without distortion of the information carried by the beam.

Figure 7:
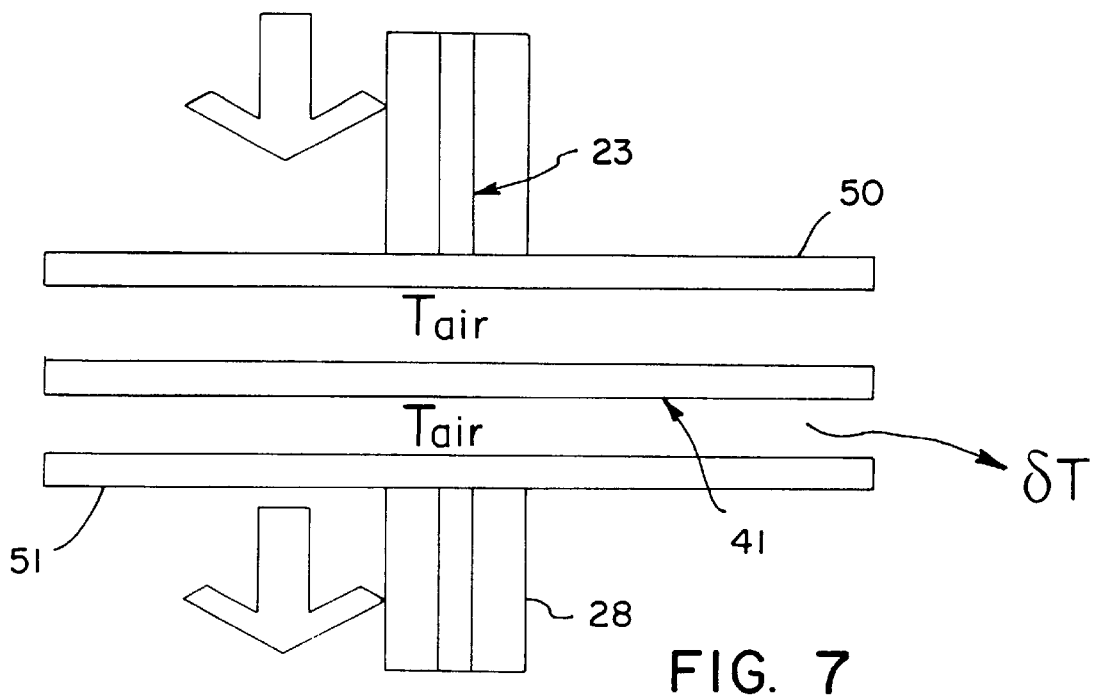
FIG. 7 is a schematic top view of the elements of an optical modulator system that may be used for error analysis with respect to offset of the positions of the elements.
Figure 8:
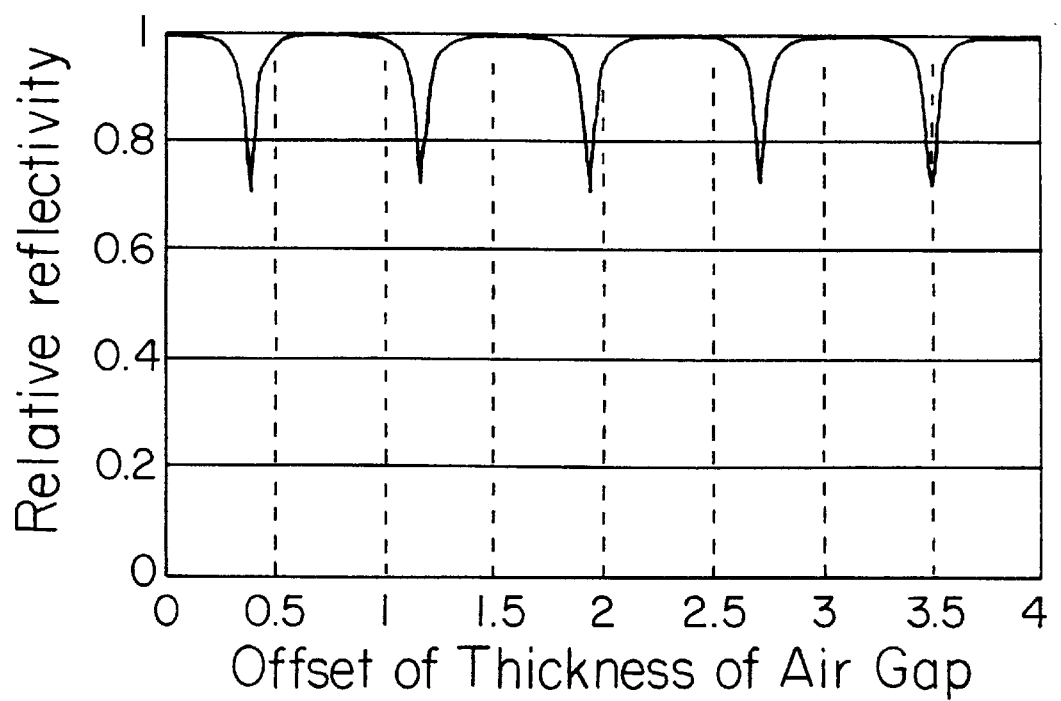
FIG. 8 is a graph showing the reflectivity variation in the optical system of FIG. 7 as a result of offset from the target thickness or spacing between elements in the optical system of FIG. 7.

FIG. 7 shows a simplified representation of the system in FIG. 4 which can be used to model the dimensional errors. Assume, for example, that the modulator is constructed for maximum reflectivity, but the air gap thickness $T_{air}$ has an offset of δT. FIG. 8 shows that if the offset is in a range of 0 to 0.3 μm or in another period, the variation of relative reflectivity is less than 1%. The small change of reflectivity and its periodic property provide a high degree of freedom for design.

Figure 9:
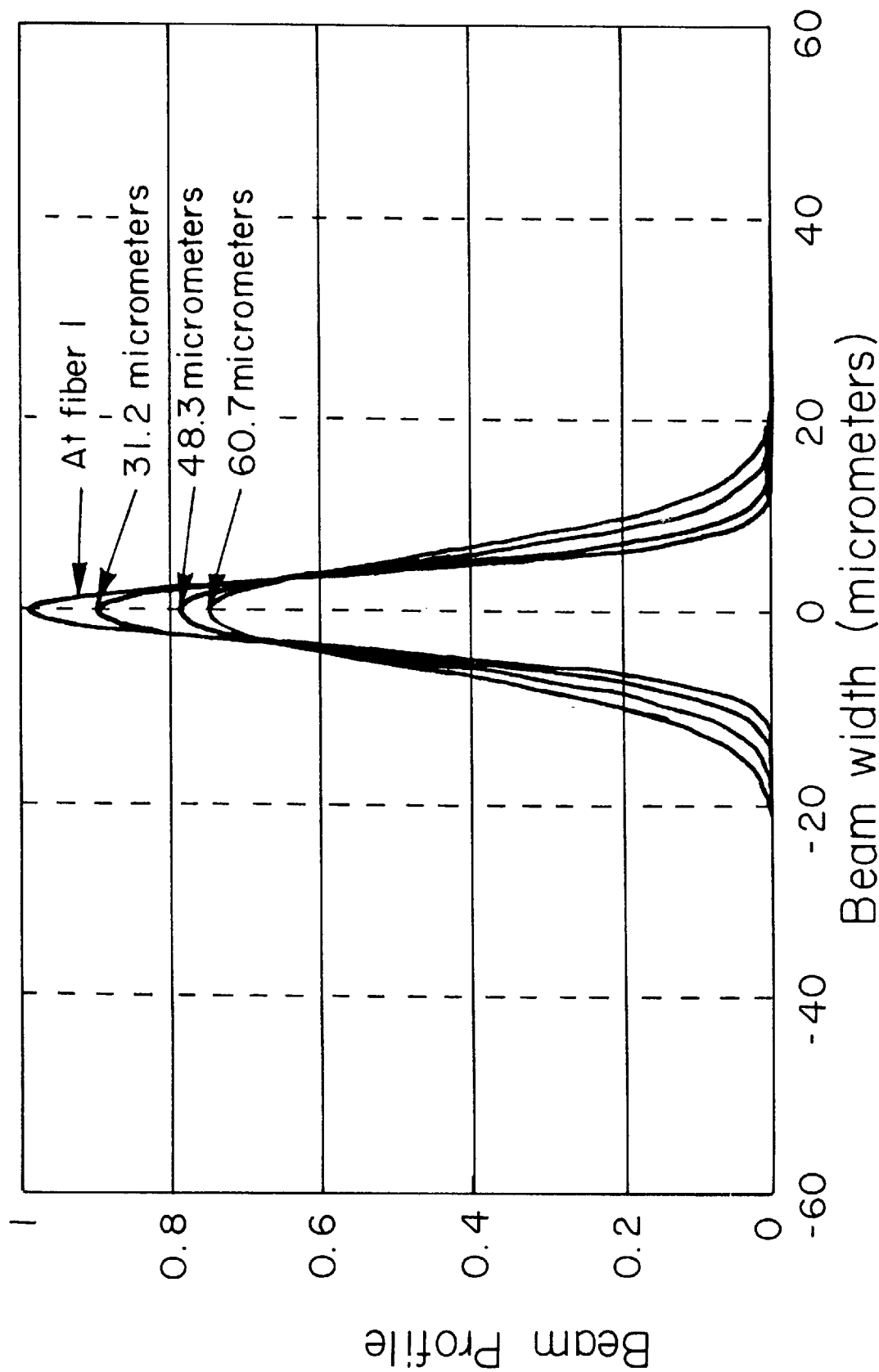
FIG. 9 are graphs illustrating the beam profiles before and after propagation from an input optical waveguide to an output optical waveguide over various coupling distances.

The propagation of light in the optical system may be modeled using the Beam Propagation Method (BPM) and encoded in Matlab™. The beam profile emerging from the optic waveguide 23 (or 24) is treated as a Gaussian distribution with $\tau_0$=5 μm for a standard 10 μm optical waveguide (e.g., fiber) core. Under zero reflectivity conditions, the final beam profiles at the entrance face of the waveguide 28 for various coupling distances with $n_1$=1.467 (waveguide core), $n_2$=1.0 (air), $n_{silicon}$=3.5 (silicon), are given in FIG. 9. If the coupling distance between waveguides is less than 40 μm, it is seen that the beam profiles have negligible distortion.

Figure 10:
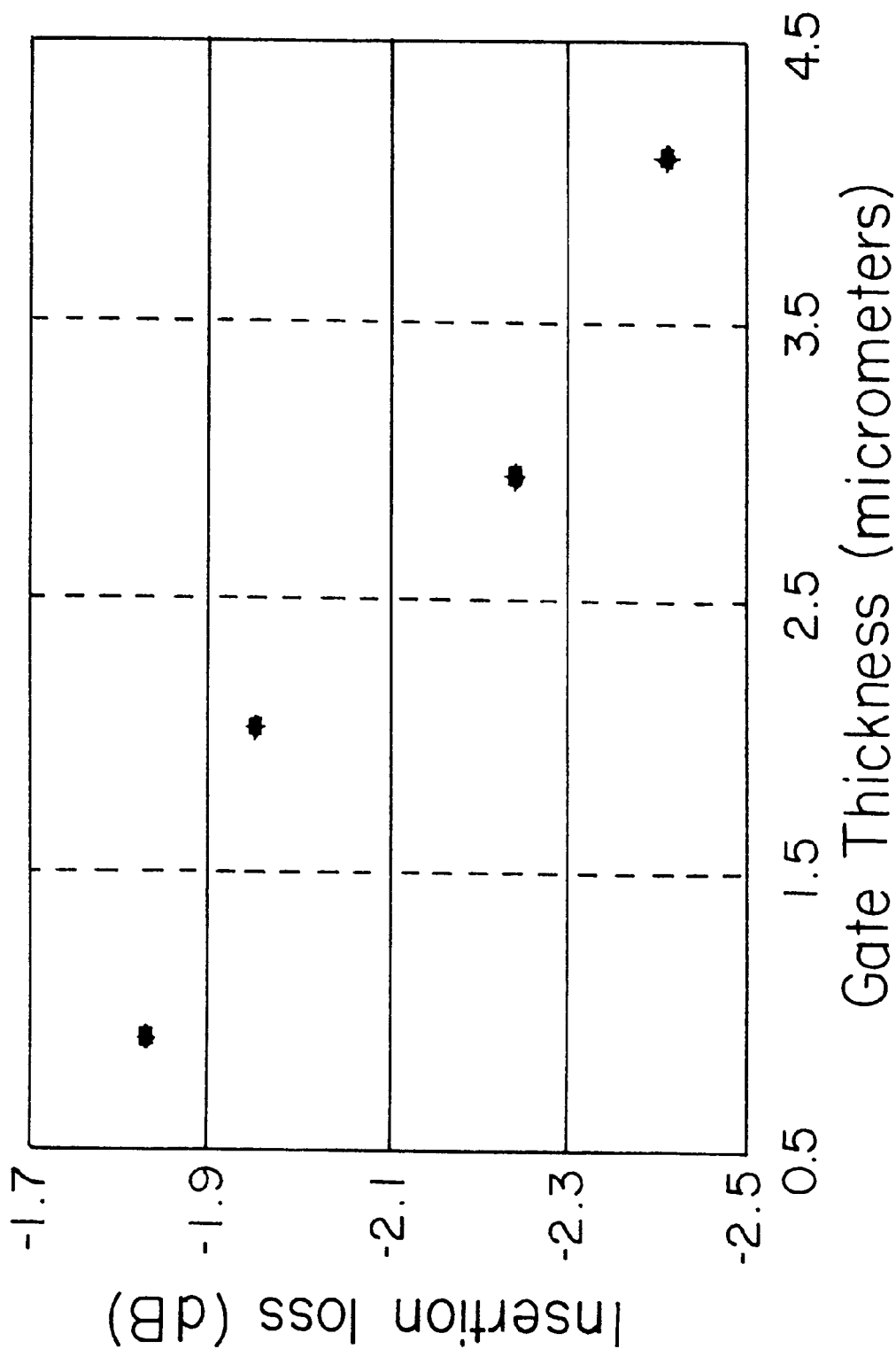
FIG. 10 is a plot illustrating the relationship between the gate thickness and the insertion loss for the optical modulator.

The insertion loss of the optical system is shown in FIG. 10 on the assumption that the system is in the zero reflectivity condition, the air gaps and the silicon interface plates are both fixed at odd multiples of $\lambda_0/4n$ (55 for the air gaps and 9 for the silicon plates 50, 51), and $T_{gate}$ is an even multiple of $\lambda_0/4n_{silicon}$. It is apparent that the insertion loss increases with the gate thickness. When the coupling distance reaches 47.47 μm and the gate thickness is 2.88 μm, the insertion loss is about −2.2 dB.

Figure 11:
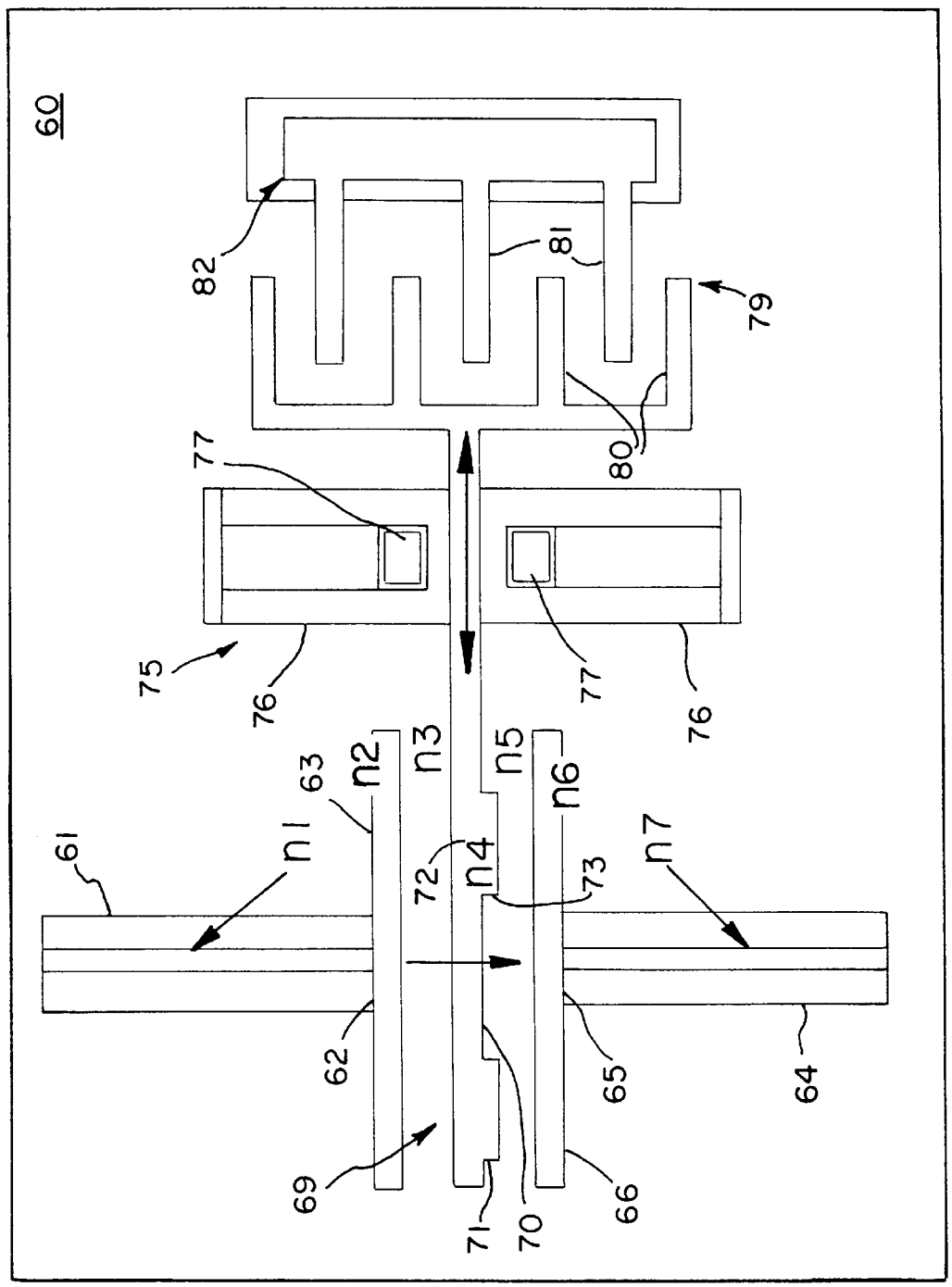
FIG. 11 is a plan view of an exemplary micromechanical optical modulator in accordance with the invention.

An exemplary implementation of the micromechanical modulator 20 is shown in FIG. 11. The exemplary modulator is formed on a substrate 60 (e.g., glass, silicon, etc.) and includes an input optical waveguide 61 (e.g., an optical fiber), the exit face 62 of which is interfaced with a single crystal silicon plate 63, e.g., by being simply abutted thereto or by being glued thereto by an appropriate glue matching the index of refraction of the core of the waveguide. An output optical waveguide 64 has an entrance face 65 to which a silicon plate 66 is abutted or affixed, e.g., with an index matching glue. As described above, an optical beam path is formed in the gap between the input and output optical waveguides. A gate of single crystal silicon 69 is mounted for lateral movement in the gap and has a light transmissive panel with a thinner base section 70 of a first thickness and two thicker sections 71 and 72. The thicker sections 71 and 72 are preferably formed integrally with the thinner section 70 of the panel, e.g., by etching a silicon bar in the region of the thinner section to leave the thicker sections 71 and 72 with the thinner section 70 of the silicon panel between them. Single crystal silicon is well suited to be used as the material of the gate for the wavelengths widely used in waveguide optic communications, e.g., 1.55 μm, at which silicon is essentially transparent. However, other suitable materials may be used for the light transmissive panel as appropriate, including silicon nitride, borosilicate glass and other glasses, silicon dioxide, polysilicon, etc. The gate 69 may be mounted for lateral translation in the gap between the waveguides 61 and 64 by a conventional spring suspension 75 composed of leaf springs 76 supported on anchors 77 that are affixed to or formed integrally with the substrate 60. An exemplary actuator is an electrostatic comb drive 79 which includes interdigitated comb elements 80, attached to the gate 69, and comb elements 81 mounted on an anchor 82 which is secured to the substrate 60. The comb elements 81 are supplied with an electrical voltage through electrical lead lines (not shown) formed on or in the substrate to draw the comb elements 80 toward the comb elements 81 as a function of the voltage applied to the comb elements 81, and thereby laterally displace the gate against the biasing return force of the spring 75. The thicknesses of the sections 70, 71 and 72 are selected as discussed above, and the spacing between the outer surfaces of these sections and the adjacent surfaces of the silicon plates 63 and 66 (serving effectively as the exit faces and entrance face of the input and output optical waveguides) are selected as discussed above, so as to provide substantially complete transmission of the beam from the waveguide 61 to the waveguide 64 when the thinner section 70 is in the beam path and substantially complete reflection when the thicker sections 71 and 72 are in the beam path, or vice versa. By partially drawing a section 71 or 72 into the beam path, so that a transition region at one of junctions 73 between the thicker and thinner sections is drawn across the beam, the amplitude of the beam transmitted can be gradually reduced (and conversely, gradually increased), if desired.

Any other micromechanical actuator may be utilized for driving the gate. As an example only, one suitable drive is an electro-thermal actuator based on a bent beam suspension as described in the paper by J. S. Park, et al., "Long Throw and Rotary Output Electro-Thermal Actuators Based on Bent-Beam Suspensions," IEEE Int. Conf. on Micro Electro Mechanical Systems (MEMS '00), Miyzaki, Japan, January, 2000, incorporated herein by reference. Another example of a micromechanical actuator utilizing an electromagnetic coil for a drive is described in U.S. Pat. No. 5,808,384, entitled "Single Coil Bi-stable, Bi-directional Micromechanical Actuator," incorporated herein by reference. However, it is understood that such actuators are merely illustrative of the many possible micromechanical actuators that may be used, all of which shall be considered micromechanical actuators herein.

Figure 12:
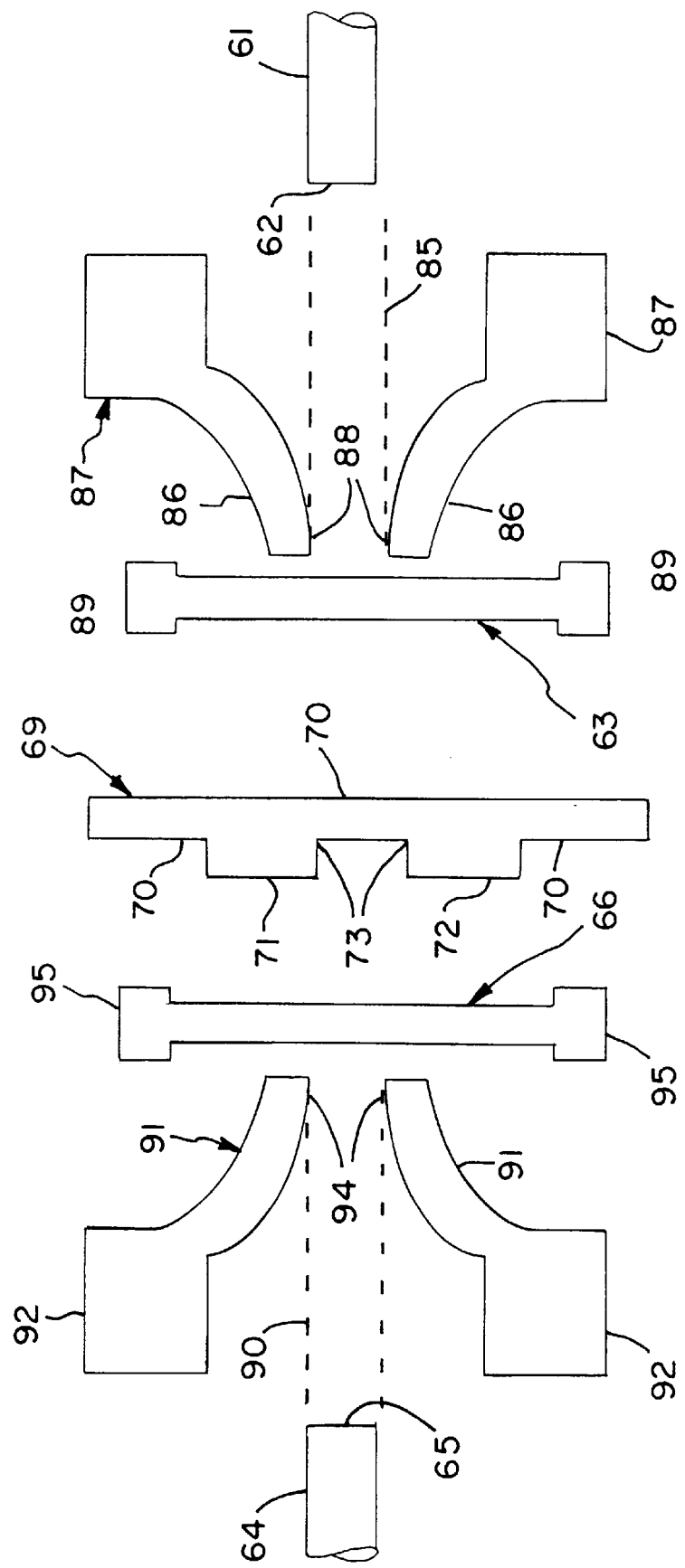
FIG. 12 is a plan view of a micromechanical structure formed on a substrate for facilitating the mounting of input and output optical waveguides in the optical modulator of the invention.

A suitable structure for mounting optical fibers used as the waveguides 61 and 64 (as well as for mounting multiple waveguides, e.g., as illustrated in FIG. 1) is shown in FIG. 12. To facilitate the placement and securement of the waveguide 61 (fiber) in its proper position, a groove 85 may be etched or otherwise formed in the substrate 60 to guide and support the waveguide 61 and that leads toward the silicon interface plate 63. To hold the waveguide 61 in position, a pair of clip sections 86 may be mounted to anchors 87 secured to the substrate 60 which are spaced at their edges 88 to define a gap slightly smaller than the diameter of the waveguide 61. During assembly, the waveguide 61 can be directed along the groove 85 into the gap between the edges 88 until the exit face 62 of the waveguide 61 meets the surface of the silicon interface plate 63. As noted, the face 62 of the waveguide may be affixed to the interface plate 63 using a glue having an appropriate index of refraction. The plate 63 may be mounted at its ends to anchors 89 affixed to the substrate 60. Similarly, the output waveguide 64 may be assembled by being directed through a groove 90 formed in the substrate into a pair of clips 91 mounted to anchors 92 affixed to the substrate, with the clips 91 having inner edges 94 spaced from each other a distance slightly less than the diameter of the waveguide 64 to engage and hold the waveguide as the waveguide 64 is inserted through the groove 90 until its face 65 meets the silicon interface plate 66. Again, the face 65 of the output waveguide 64 may be glued to the silicon plate 66 with an appropriate glue, and the plate 66 may be mounted to the substrate on anchors 95. As discussed above, with the use of such interface plates, the outer surfaces of the interface plates effectively act as the exit and entrance faces of the waveguides.

Figure 13:
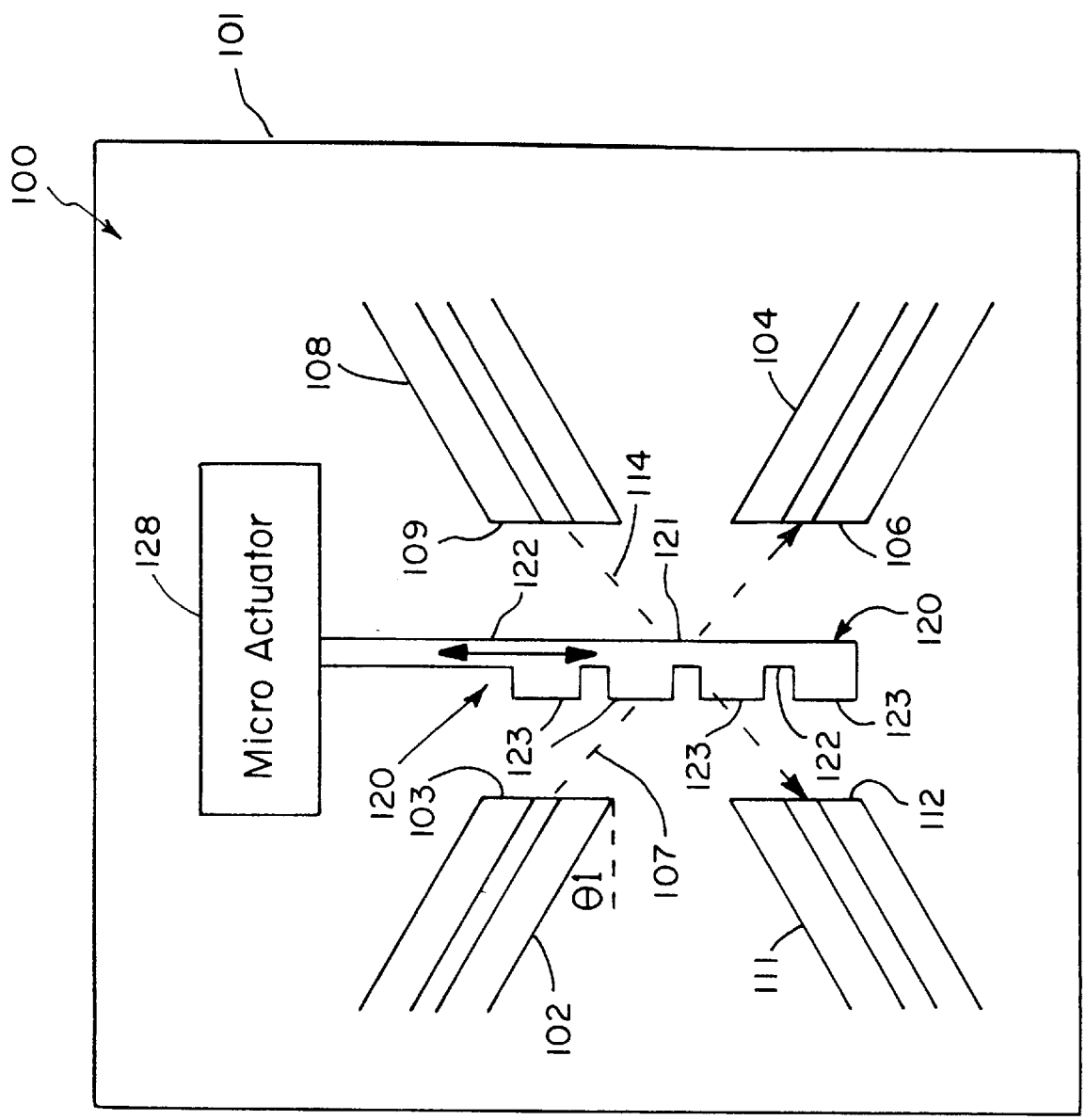
FIG. 13 is a plan view of a micromechanical optical modulator implementing a crossbar optical switch in accordance with the invention.

The present invention may also be embodied in a crossbar type switch which switches an optical communication beam between two possible paths, as illustrated generally at 100 in FIG. 13. The crossbar switch 100 is formed on a substrate 101, e.g., glass, single crystal silicon, etc., and has a first input waveguide 102 with an exit face 103 and a first output waveguide 104 with an entrance face 106 which is directly across from the exit face 103 on a beam path 107 in position to receive the beam projected from the exit face 103 of the waveguide 102. The crossbar switch also has a second input optical waveguide 108 with an exit face 109 and a second output optical waveguide 111 with an entrance face 112 directly across from the exit face 109 on a beam path 114 from the input waveguide 108 in position to receive the beam projected from the exit face 109 of the input waveguide 108. As illustrated in FIG. 13, the input and output waveguides are mounted in pairs diagonally to one another (and may be mounted to the substrate as illustrated above with respect to FIG. 12), with their entrance and exit faces preferably beveled with respect to the axis of the waveguide so that the faces 103, 106, 109 and 112 are parallel to one another and to the surfaces of the gate sections and so that the faces of the input and output waveguides are spaced from one another across a gap. The beam paths 107 and 114 are diagonal to and cross each other. A phase shifting gate 120 in accordance with the invention is mounted in the gap between the exit and entrance faces of the waveguides (preferably at the cross over of the beam paths 107 and 114) and includes a light transmissive panel 121 having thin sections 122 and thick sections 123, formed as discussed above. The outer surfaces of the panel 121 are parallel to one another and are oriented at an acute angle between 0° and 90° with respect to the beams projected from the input waveguides. The phase shifting gate 120 is driven laterally in the gap between the waveguides by a microactuator 128, which may be any type of microactuator as discussed above (and which may incorporate springs or other mounting systems in a conventional fashion). In a first position of the phase shifting gate 120, the beam paths 107 and 114 pass through the thinner sections 122 of the transmissive panel 121. In a second position of the phase shifting gate 120, to which the gate is translated by the action of the microactuator 122, the gate is in a position in which the beam path 107 and the beam path 114 intersect the thicker sections 123 of the phase shifting gate. The light transmissive material of the gate 121 (e.g., single crystal silicon for typical communication light wavelengths in the infrared region) and the spacing between the input and output faces and the surfaces of the thicker and thinner sections of the gate are selected as discussed above for a selected wavelength in the light beam to yield substantially complete transmission when the beam paths 107 and 114 intersect the thinner sections of the gate (or the thicker sections), so that the beam from the first input waveguide 102 passes directly to and is received by the entrance face of the first output waveguide 105, and the beam 114 from the second input waveguide 108 passes through and is received by the entrance face of the second output waveguide 111. In the second position of the phase shifting gate, a beam 107 from the first input waveguide 102 is reflected from the thicker section 123 of the phase shifting gate and is directed to the entrance face 112 of the second output waveguide 111; similarly, the beam 114 from the second input waveguide 108 is reflected from a thicker section 123 of the gate to the entrance face 106 of the second output waveguide 105. In this manner, a fiber optic communication link can be switched between different communication channels in an optical network. Of course, the optical switch 100 may utilize only a single input waveguide 102, providing an output beam that is directed to one of two output waveguides 104 or 111. Modeling indicates that the relative reflectivity of a crossbar switch of the type 100 can be more than 95%. The performance is found to increase as the input waveguide angle (and thus the angle of incidence of the beams on the outer surfaces of the gate sections) with respect to a normal to the surfaces of the gate sections 121 and 123 is increased up to about 30°. For the crossbar switch 100, the interface plates discussed above with respect to the modulators of FIGS. 4 and 11 are generally not utilized as they do not provide a significant advantage in optical performance. The waveguides 102, 105, 108 and 111 may be mounted in place utilizing the clips shown in FIG. 12, by gluing to the substrate, or by any other suitable mechanical restraint. To accommodate the diameter of the input and output waveguides, the dimensions of the phase shifting gate along with the integrated microactuator may typically be in the range of 50 to 500 μm.

Figure 14:
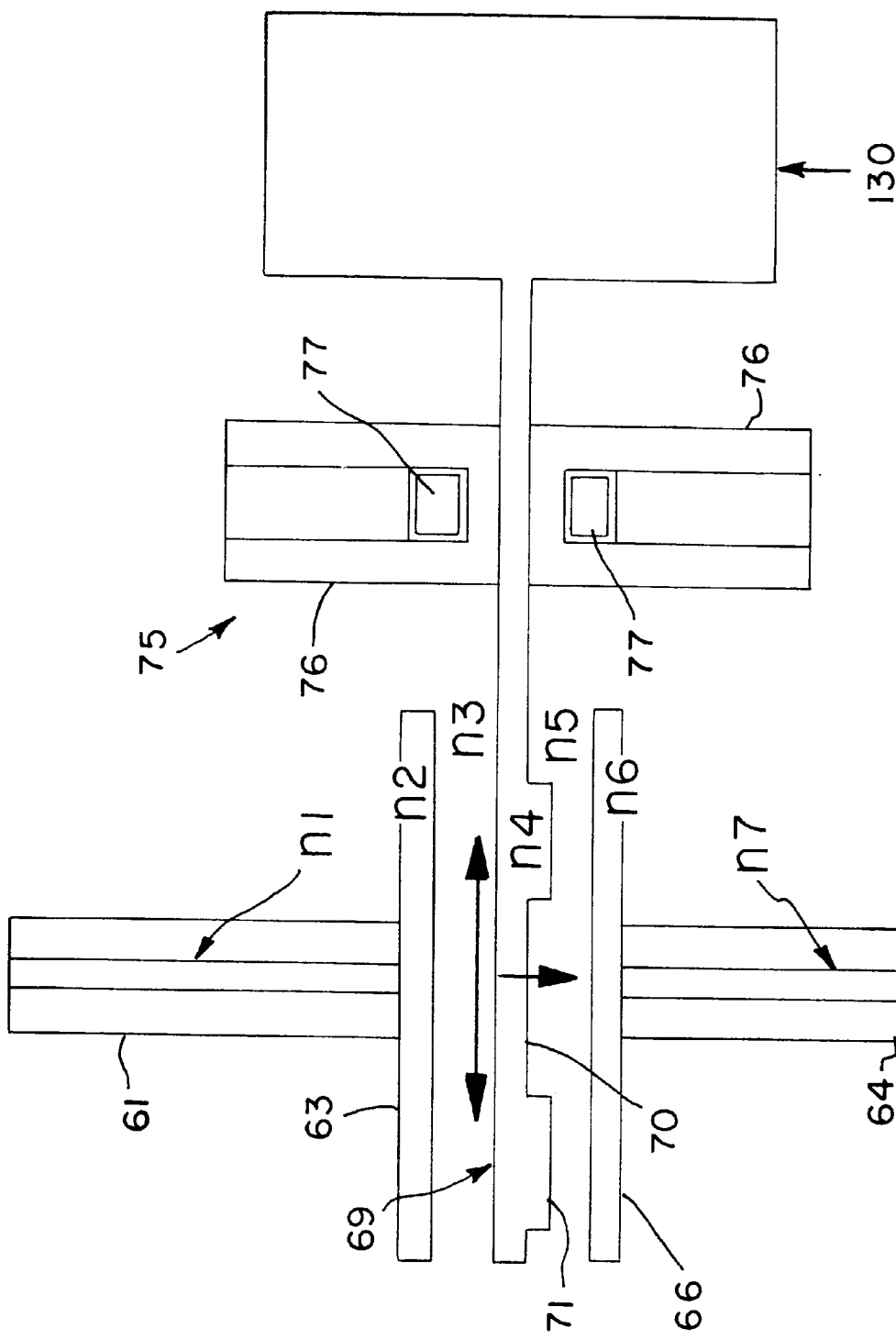
FIG. 14 is a plan view of a micromechanical optical modulator implementing a micro-accelerometer in accordance with the invention.

The present invention may also be embodied in various types of sensors and detectors. An example is a microaccelerometer, as illustrated in FIG. 14, utilizing the phase shifting gate structure of FIG. 11 with a proof mass 130 affixed to the end of the phase shifting gate 69 in place of the actuator 79. In effect, the mass 130 functions as an actuator, applying a force to the phase shifting gate 69 to displace it laterally as a result of acceleration having a component in a direction parallel to the lateral permitted direction of translation of the gate 69. The mass 130 may be, e.g., silicon fabricated integrally with the gate structure 69, or a material that is attached separately to the gate. Because the microaccelerometer of the present invention incorporates optical pick-off, excellent reliability and immunity to noise is obtained. Such optical methods are also relatively insensitive to contamination, to roughness, and to variations in electrical properties of the moving element, offer greater immunity to thermal drifts, and offer a wider dynamic range. The accelerometer of FIG. 14 offers several advantages over other types of microaccelerometer designs. Because the motion is detected optically and has a wide dynamic range, the devices may be operated in both open-loop and closed-loop (servo-controlled) systems. Secondly, the high precision of the optical pick-offs in accordance with the invention permits the use of a stiffer mechanical suspension 75 in the accelerometer, thus widening the bandwidth of operation. This is partially facilitated by the fact that most of the elements of the optical system can be located remotely and shared with other application requirements. Only the phase shifting gate must be located proximate to the proof mass.

Figure 15:
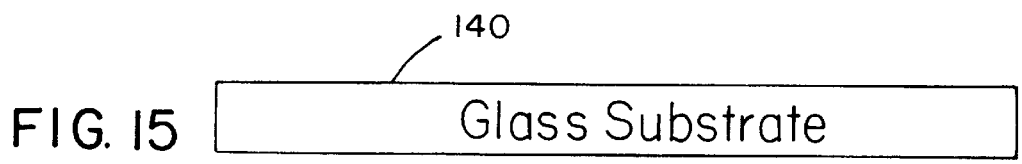
FIGS. 15–18 are simplified views illustrating a fabrication and assembly process for forming the micromechanical optical modulators of the invention.
Figure 16:
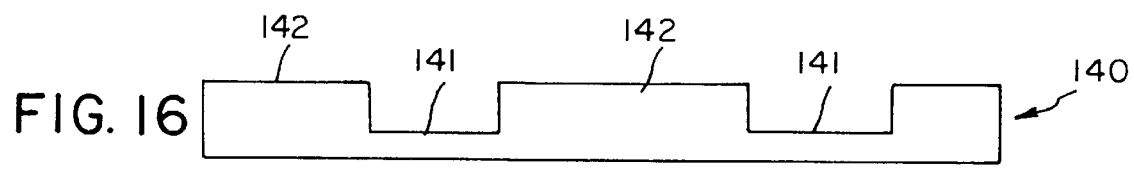
Figure 17:
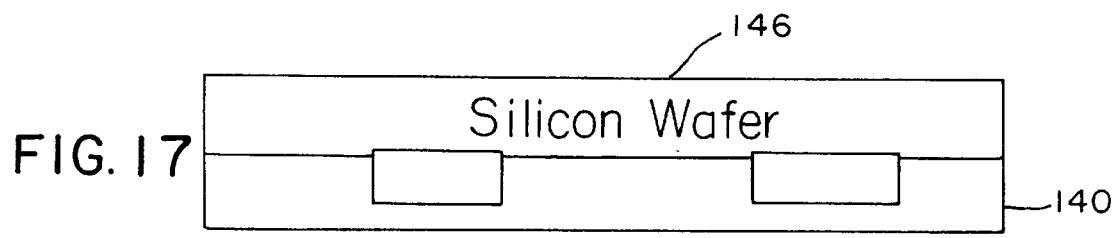
Figure 18:
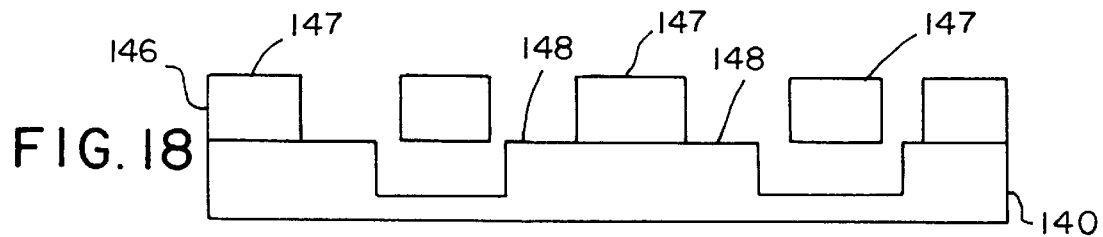

Various fabrication procedures can be utilized to produce the phase shifting gate structure in accordance with the invention. For purposes of exemplification only, one suitable fabrication process is illustrated with respect to FIGS. 15–18. A glass substrate 140, as shown in FIG. 15, may be utilized on which the structures are formed. Preferably, the glass substrate is selected to be a material which is expansion matched to silicon, e.g., Hoya™ SD2 or Corning™ #7740 glass. In a first lithography step, as illustrated in FIG. 16, the substrate 140 is recessed in all areas 141 except for the areas 142 at which the microstructures will be anchored. As illustrated in FIG. 17, a silicon wafer 146 is then anodically bonded to the substrate 140. In a second lithography step, the result of which is illustrated in FIG. 18, the silicon wafer 146 is then patterned and anisotropically etched, preferably using a deep reactive ion etch (DRIE) process, such as the Bosch™ process in an inductively coupled plasma (ICP) etcher, to form isolated silicon structures 147 separated by open areas 148. A variation of this process may be optimized to obtain smooth sidewalls. A double-sided silicon wafer (which is polished on both sides) is preferably used because a smooth surface is required for both bonding and lithography. A third lithography step (not shown) can be used to pattern metal interconnects on the glass substrate before the silicon wafer is bonded to it. This is necessary for electrical connection to the microactuator used in the crossbar switch, although it may be omitted for an open-loop implementation of an accelerometer. A glass substrate offers the option of coupling light in from underneath a substrate, which may be useful in many applications. However, it is also possible to replace the glass substrate with a silicon substrate, other semiconductors, or other insulators. For a silicon substrate, the recessed substrate preferably would be oxidized to provide an etch-stop for the DRIE step. The silicon substrate is then fusion bonded to the structural silicon wafer. Since fusion bonding is most effective at elevated temperature (about 1,000° C.), a substrate wafer would generally be metalized prior to bonding, but the interconnects would be patterned on the upper surface of the structural silicon wafer under the DRIE mask.

The grooves for mounting fiber optic waveguides utilized in the crossbar switch and accelerometer may be formed in the substrate wafer in the first lithography step, and the flexible clips may be formed from the structural silicon to assist in the precise assembly of the optical waveguides.

Figure 19:
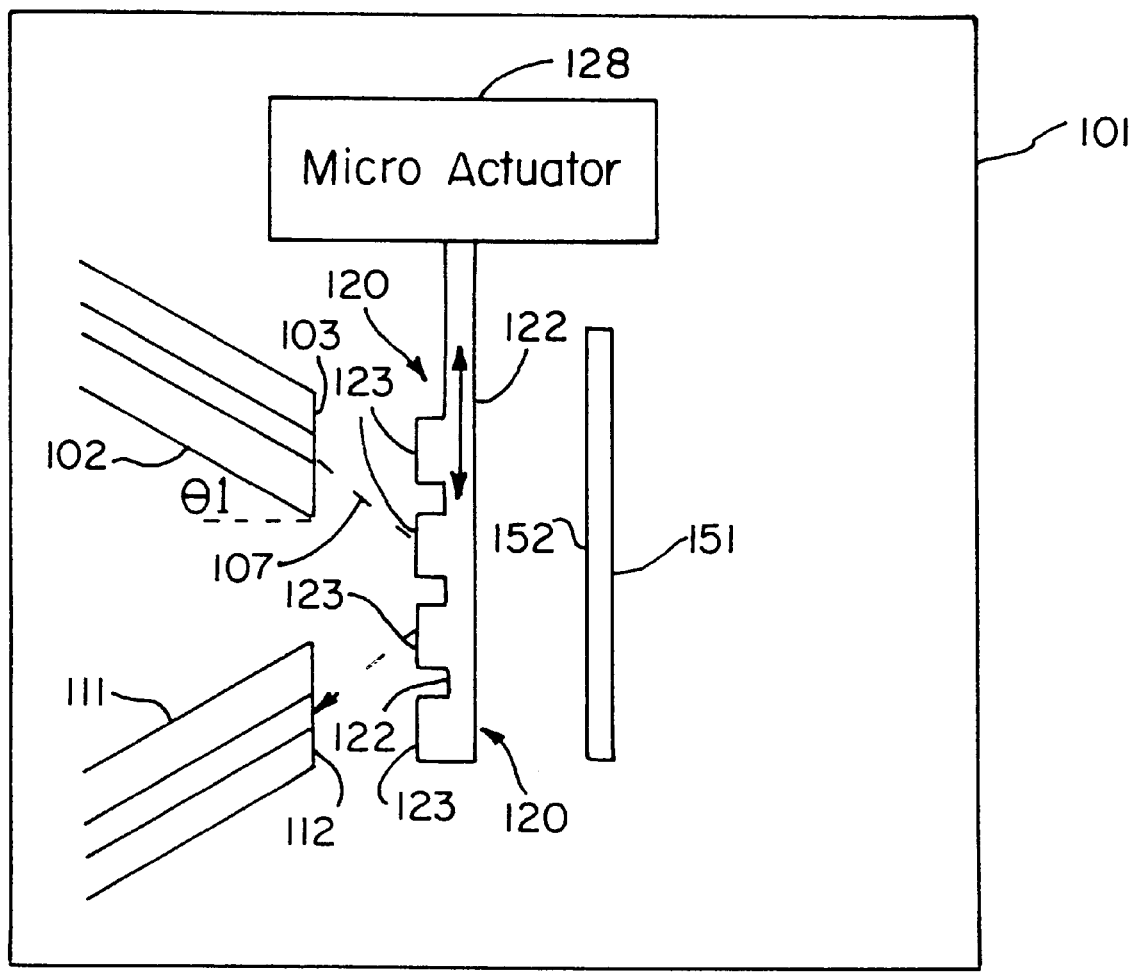
FIG. 19 is a plan view of another embodiment of the micromechanical modulator in accordance with the invention.

The micromechanical modulator in accordance with the invention may also be utilized with an input optical waveguide having an exit face and an output optical waveguide having an entrance face that are both on the same side of the phase shifting gate. For example, as illustrated in FIG. 19, a structure similar to the crossbar switch 100 of FIG. 19 may be utilized in which there is a single input optical waveguide 102 and a single output optical waveguide 111. In a first position of the gate 120, the light emitted from the exit face 103 of the waveguide 102 passes through the gate 121 and no light is received by the output waveguide 111. In the second position of the gate, the light is reflected by interference effects into the entrance face 112 of the output waveguide 111. The light transmissive plate 151 having a flat surface 152 substitutes for the entrance face 106 of the second output fiber 104 to provide the interference effects by which the light beam from the input fiber 102 is reflected to the output fiber 111. The plate 151 may be formed, for example, of silicon.

Figure 20:
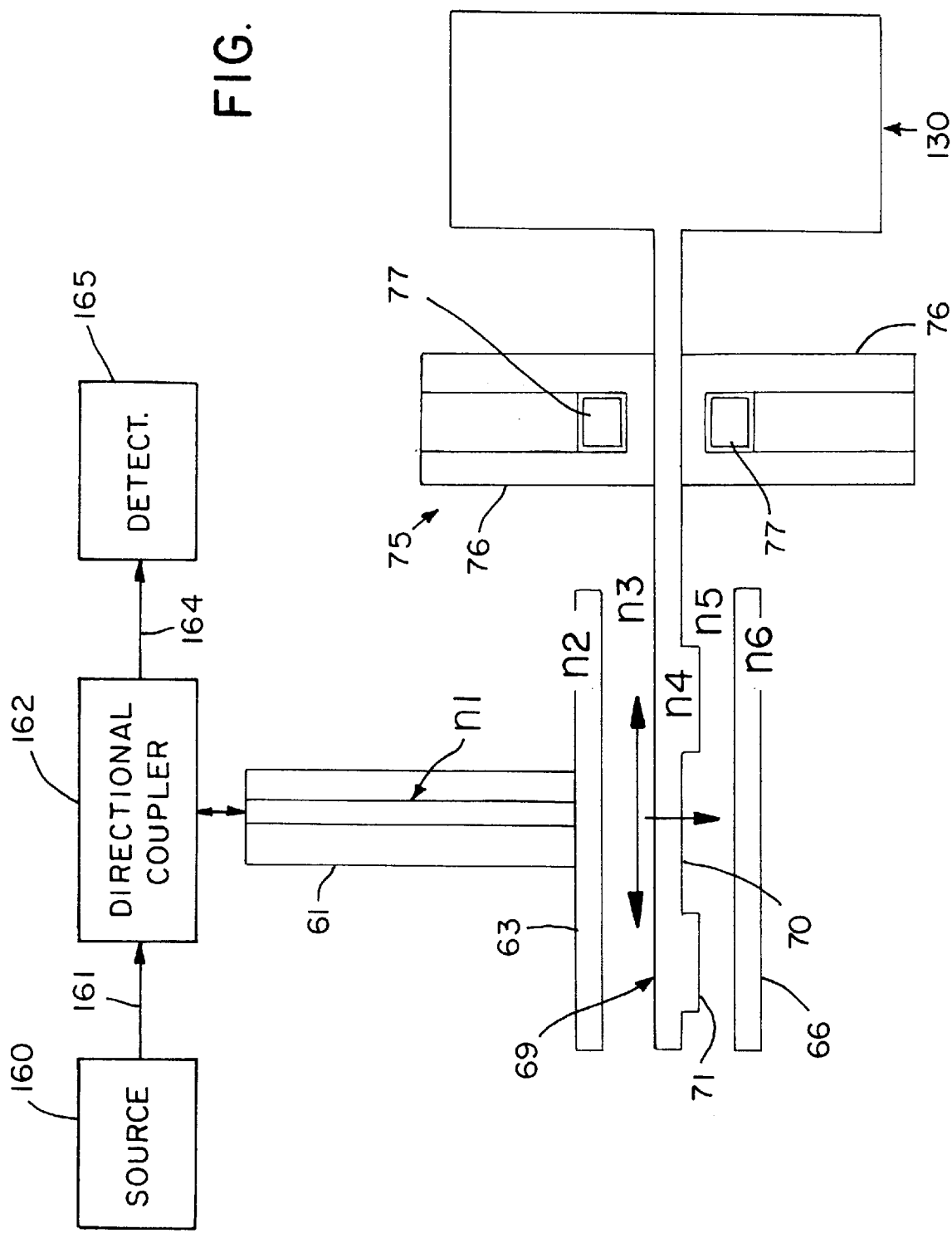
FIG. 20 is a plan view of another embodiment of a micromechanical modulator implementing a microaccelerometer.

Similarly, a single optical waveguide such as an optical fiber may be utilized in accordance with the invention to detect displacement of the phase shifting gate in a sensor. An example thereof is shown in FIG. 20, which is similar to the accelerometer of FIG. 14 except it does not utilize an output optical waveguide 64. The surface of the light transmissive interface plate 66 that faces the gate 69 functions as discussed above to provide reflection of a light beam exiting from the input fiber 61 by interference effects. The reflected light is passed back to the exit face of the input optical waveguide 61. As illustrated in FIG. 20, a source 160 may direct the input light on a fiber 161 to a directional coupler 162 which transmits the input light on the fiber 61. The reflected light that passes into the fiber 61 is passed back to the directional coupler 162 and is directed on an optical fiber 164 to a detector 165. In this manner, the displacements of the gate caused by the force of the proof mass 130 in response to accelerations (or displacements of the gate by other means in other sensors) affects the light reflected back to the fiber 61, which can be detected by the detector 165 to thereby sense the displacement of the gate.

Figure 21:
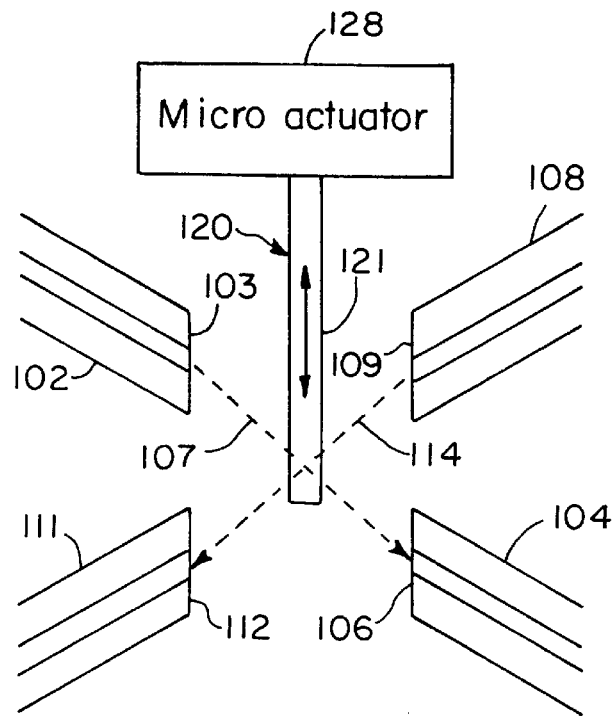
FIG. 21 is a plan view of a micromechanical modulator implementing a crossbar optical switch which has a gate of a single thickness.

As indicated above, the micromechanical optical modulator of the present invention may utilize a gate having a single thickness light transmissive panel rather than a panel of two different thicknesses. This implementation of the invention is illustrated with respect to the crossbar switch of FIG. 21, which is similar to the crossbar switch 100 of FIG. 13, except that the gate 120 has a light transmissive panel 121 which has a single thickness. The actuator 128 is operatively connected to the gate 120 to switch the gate between at least two positions, in one of which the panel 121 is entirely out of the beam paths 107 (between the optical waveguides 102 and 104) and the beam path 114 (between the optical waveguides 108 and 111), allowing the beams to be transmitted unimpeded between the input and output fibers. In the second position of the gate 120 as illustrated in FIG. 21, the light transmissive panel 121 is interposed into the beam paths 107 and 114. The thickness of the light transmissive panel, its refractive index, and the spacing of the outer surfaces of the panel 121 with respect to the exit and entrance faces of the optical waveguides is selected with respect to the wavelength of the light in the beams to reflect the beams by interference effects, thereby deflecting the beam 107 to the entrance face 112 of the output fiber 111, and reflecting the beam 114 to the entrance face of the output fiber 104.

The micromechanical optical modulators of FIGS. 1, 4, 11, 14, 19 and 20 may similarly be implemented utilizing a gate having a single thickness. Where a gate is to be utilized which is supported mechanically at an end of the gate opposite that to which the actuator is attached (for example, as shown in FIGS. 1 and 4) openings may be formed (e.g., by etching) through the light transmissive panels of the gates at positions which correspond to the position of the beam path in one of the positions of the gate.

Figure 22:
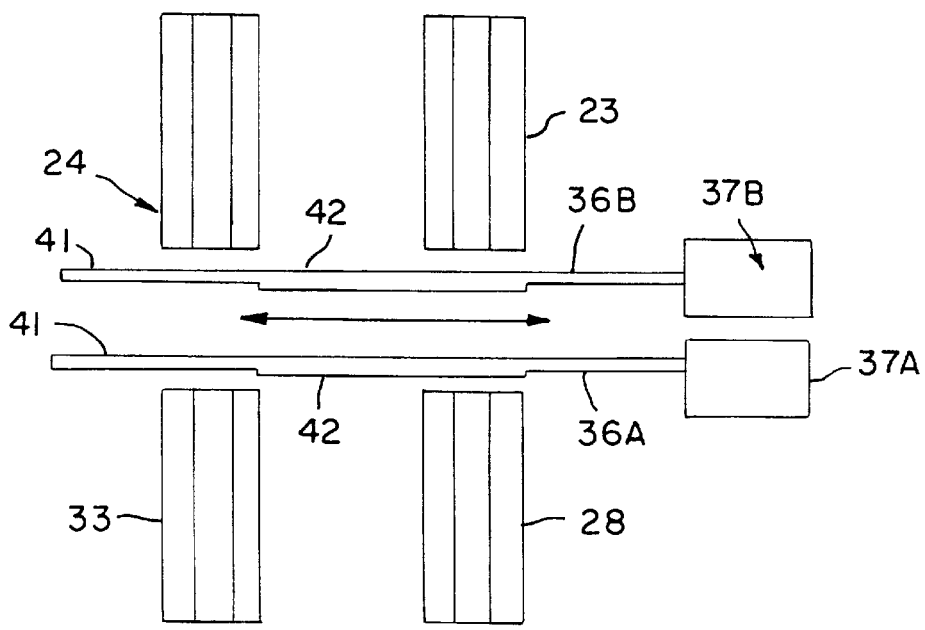
FIG. 22 is a plan view of a micromechanical optical modulator which can function as a logic gate.

Further, the present invention may be utilized for performing logic operations. An example of a logic gate implemented utilizing the present invention is shown in FIG. 22, in which a structure similar to that of FIG. 1 is utilized which has a first gate 36A driven by an actuator 37A and a second gate 36B driven by an actuator 37B. The beam is passed from the input optical waveguide 23 to the output optical waveguide 28 when both actuators 37A and 37B are switched, whereas the beam is passed from the input optical waveguide 24 to the output optical waveguide 33 only when both of the actuators 37A and 37B are not switched (or vice versa). Thus, the actuation of the actuators 37A and 37B functions as an AND gate for the signal between the waveguides 23 and 28 and as a NOR gate for the signal between the optical waveguides 24 and 33.

It is understood that the invention is not limited to the embodiments set forth herein, but embraces all such forms thereof as come within the scope of the following claims.

What is claimed is:

1. A micromechanical optical modulator comprising:
   (a) an input optical waveguide with an exit face from which a light beam can exit the waveguide;
   (b) an output optical waveguide with an entrance face spaced from the exit face of the input optical waveguide to receive a light beam exiting from the exit face of the input optical waveguide on a beam path; and
   (c) a phase shifting gate mounted between the input optical waveguide and output optical waveguide, the phase shifting gate having a light transmissive panel having at least one section having outer surfaces, the phase shifting gate translatable between at least two positions, wherein in one of the positions of the gate the beam is transmitted from the input optical waveguide on the beam path to the output optical waveguide, and in the other position of the gate, the panel section is interposed in the beam path from the input optical waveguide to the output optical waveguide, wherein the spacing between the exit face of the input optical waveguide and the adjacent outer surface of the section of the light transmissive panel, the spacing between the entrance face of the output optical waveguide and the adjacent outer surface of the section of the light transmissive panel, and the index of refraction of the light transmissive panel are selected for a selected wavelength of light in a beam exiting from the exit face of the input optical waveguide such that in the position of the phase shifting gate in which the section of the light transmissive panel is interposed in the beam path, the light in the beam is substantially reflected by interference effects.

2. The optical modulator of claim 1 wherein the light transmissive panel of the gate is formed of silicon.

3. The optical modulator of claim 2 wherein the wavelength of light in the beam exiting from the exit face of the input waveguide is centered at 1.55 μm.

4. The optical modulator of claim 1 wherein in the position of the gate in which the light beam is transmitted on the beam path from the input optical waveguide to the output optical waveguide, the gate panel is out of the beam path.

5. The optical modulator of claim 1 wherein the input and output optical waveguides comprise optical fibers.

6. The optical modulator of claim 1 wherein the phase shifting gate has a light transmissive panel having at least two sections having outer surfaces, one thicker section having a thickness greater than that of another thinner section, wherein in one of the positions of the gate the thinner section of the light transmissive panel is interposed in the beam path between the input optical waveguide and the output optical waveguide and in the other position of the gate the thicker section is interposed in the beam path from the input optical waveguide to the output optical waveguide, wherein the spacing between the exit face of the input optical waveguide and the adjacent outer surfaces of the light transmissive panel in the thicker and thinner sections, the spacing between the entrance face of the output optical waveguide and the adjacent outer surfaces of the thicker and thinner sections of the light transmissive panel, and the index of refraction of the light transmissive panel are selected for a selected wavelength of light in a beam exiting from the exit face of the input optical waveguide such that in one of the positions of the phase shifting gate the beam is transmitted through the light transmissive panel and in a second position of the gate, the light in the beam is substantially reflected by interference effects.

7. The optical modulator of claim 6 wherein there are at least two input optical waveguides and at least two output optical waveguides, each output optical waveguide paired with an input optical waveguide such that a beam is directed on a beam path from an exit face of each input optical waveguide to an entrance face of an output optical waveguide that is spaced therefrom, wherein in one of the positions of the phase shifting gate the thicker section of the light transmissive panel is in the beam path between one of the pairs of input and output optical waveguides and the thinner section of the light transmissive panel is in the beam path between another of the pairs of input and output optical waveguides, and wherein the thicknesses of the sections between the pairs of optical waveguides is switched in the other position of the gate.

8. The optical modulator of claim 7 wherein the pairs of input and output waveguides are arranged such that the beam paths between the pairs of optical waveguides are parallel to one another, and wherein the phase shifting gate is mounted for translation perpendicularly to the beam paths between the pairs of optical waveguides, and wherein, in one position of the gate, the beam is transmitted through the gate panel between a first of the pairs of input and output optical waveguides and the beam between the second of the pairs of optical waveguides is reflected by interference effects and wherein, in the other position of the gate, the beam between the second of the pairs of optical waveguides is transmitted through the gate panel and the beam between the first pair of optical waveguides is reflected by interference effects.

9. The optical modulator of claim 8 wherein the light transmissive panel of the phase shifting gate is formed of silicon and including an interface plate formed of silicon secured to the exit faces of the input optical waveguides and an interface plate formed by silicon secured to the entrance faces of the output optical waveguides.

10. The optical modulator of claim 6 wherein there are at least two input optical waveguides and at least two output optical waveguides, each output optical waveguide paired with an input optical waveguide such that a beam is directed on a beam path from an exit face of each input optical waveguide to an entrance face of an output optical waveguide that is spaced therefrom, the pairs of input and output optical waveguides arranged such that the beam paths between the two pairs of optical waveguides are diagonal to and cross each other, and wherein in one of the positions of the phase shifting gate the thicker section of the light transmissive panel is in the beam paths between the pairs of input and output optical waveguides in the other of the positions of the gate the thinner section of the light transmissive panel is in the beam paths between the pairs of input and output optical waveguides.

11. The optical modulator of claim 6 wherein the phase shifting gate is mounted for translation perpendicularly to the beam path from the exit face of the input optical waveguide to the entrance face of the output optical waveguide, and wherein the surfaces of the thicker section and the thinner section of the light transmissive panel of the phase shifting gate are parallel to one another and to the exit face and to the entrance face, and wherein in a first position of the gate wherein one of the sections is in the beam path, for a beam having a selected wavelength $X_0$, the spacing between the entrance face and the surface of the panel section adjacent to it and the spacing between the entrance face and the surface of the panel section adjacent to it are selected to be odd multiples of $\lambda_0/4n_{air}$, and the thickness of the one section between its surface is selected to be an odd multiple of $\lambda_0/4n_g$ to obtain maximum reflectivity, where $n_{air}$ is the index of refraction of air and $n_g$ is the index of the refraction of the material of the transmissive panel, and in the other position of the gate the thickness of the other section of the gate between its surfaces which is now in the beam between the exit face and the entrance face is selected to be an even multiple of $\lambda_0/4n_g$ to obtain minimum reflectivity and maximum transmission through the gate.

12. The optical modulator of claim 11 wherein the light transmissive panel of the gate is formed of silicon.

13. The optical modulator of claim 1 further including a micromechanical actuator connected to the gate to drive the gate between its at least two positions.

14. The optical modulator of claim 13 further including a micromechanical spring mounted to a substrate and connected to the phase shifting gate to support the gate for lateral translation between its positions above the substrate.

15. The optical modulator of claim 13 wherein the actuator comprises interdigitated comb elements, one set of comb elements connected to the gate and the other set of comb elements mounted to a substrate such that a voltage applied to one of the sets of comb elements will draw the comb elements together to drive the gate.

16. The optical modulator of claim 1 wherein the spacing between the exit face of the input optical waveguide and the entrance face of the output optical waveguide is less than 1 mm.

17. The optical modulator of claim 16 wherein the spacing between the exit face and the entrance face is less than 40 µm.

18. The optical modulator of claim 1 wherein the light transmissive panel of the phase shifting gate is formed of silicon and including an interface plate formed of silicon secured to the exit face of the input waveguide and an interface plate of silicon secured to the entrance face of the output waveguide.

19. The optical modulator of claim 1 further including a proof mass connected to the phase shifting gate and a support spring connected to the phase shifting gate to support the gate for lateral motion and to bias the gate back to a normal position, such that the proof mass will displace the phase shifting gate in response to acceleration.

20. The optical modulator of claim 1 including micromechanical clips formed on a substrate into which the input optical waveguide and the output optical waveguide are inserted to hold them in place.

21. A micromechanical optical modulator switch comprising:
(a) two input optical waveguides each with an exit face from which a light beam can exit the waveguide;
(b) two output optical waveguides each with an entrance face spaced from an exit face of one of the input optical waveguides to receive a light beam exiting from the exit face of the input optical waveguide on a beam path to define two pairs of input and output optical waveguides, wherein the pairs of input and output optical waveguides are arranged such that the beam paths between the two pairs of optical waveguides are diagonal to and cross each other;
(c) a phase shifting gate mounted between the input optical waveguides and the output optical waveguides, the phase shifting gate having a light transmissive panel having at least one section having outer surfaces, the phase shifting gate translatable between at least two positions, wherein in one of the positions of the gate the beams are transmitted on the beam paths between each pair of input and output optical waveguides, and in the other position of the gate the one section is interposed in the beam paths between the pairs of optical waveguides, wherein the spacing between the exit faces of the input optical waveguides and the adjacent surface of the section of the light transmissive panel, the spacing between the entrance faces of the output optical waveguides and the adjacent surfaces of the section of the light transmissive panel, and the index of refraction of the light transmissive panel are selected for a selected wavelength of light in the beam exiting from the exit faces of the input optical waveguides such that in the position of the phase shifting gate in which the panel section is interposed in the beam paths, the light in the beams between the pairs of optical waveguides is substantially reflected by interference effects; and
(d) a micromechanical actuator connected to the gate to drive the gate between its at least two positions.

22. The optical modulator switch of claim 21 wherein in the position of the gate in which the light in the beams is reflected, the beam from the input optical waveguide in a first pair of optical waveguides is reflected to and is received by the entrance face of the output optical waveguide in the second of the pairs of optical waveguides, and the beam from the input optical waveguide in the second of the pairs of optical waveguides is reflected to and is received by the entrance face of the output optical waveguide in the first of the pairs of optical waveguides.

23. The optical modulator switch of claim 21 wherein the light transmissive panel of the gate is formed of silicon.

24. The optical modulator switch of claim 23 wherein the wavelength of light in the beams exiting from the exit faces of the input waveguides is centered at 1.55 µm.

25. The optical modulator switch of claim 21 further including a micromechanical spring mounted to a substrate and connected to the phase shifting gate to support the gate for lateral translation between its positions above the substrate.

26. The optical modulator switch of claim 25 wherein the actuator comprises interdigitated comb elements, one set of comb elements connected to the gate and the other set of comb elements mounted to a substrate such that a voltage applied to one of the sets of comb elements will draw the comb elements together to drive the gate.

27. The optical modulator switch of claim 21 wherein the spacing between the exit face of the input optical waveguide in each pair and the entrance face of the output optical waveguide in each pair is less than 1 mm.

28. The optical modulator switch of claim 27 wherein the spacing between the exit face and the entrance face of the optical waveguides in each pair is less than 40 µm.

29. The optical modulator switch of claim 21 wherein the input and output optical waveguides comprise optical fibers.

30. The optical modulator switch of claim 21 wherein in the position of the gate panel in which the light beams are transmitted on the beam paths between the pairs of input and output waveguides, the gate panel is out of the beam paths.

31. The optical modulator switch of claim 21 wherein the phase shifting gate has a light transmissive panel having at least two sections having outer surfaces, at least one thicker section having a thickness greater than that of at least one other thinner section, wherein in one of the positions of the gate a thinner section of the light transmissive panel is interposed in the beam paths between the pairs of optical waveguides, and in the other position of the gate a thicker section is interposed in the beam paths between the pairs of optical waveguides, wherein the spacing between the exit faces of the input optical waveguides and the adjacent surfaces of the light transmissive panel in the thicker and thinner sections, the spacing between the entrance faces of the output optical waveguides and the adjacent surfaces of the thicker and thinner sections of the light transmissive panel, and the index of refraction of the light transmissive panel are selected for a selected wavelength of light in the beam exiting from the exit faces of the input optical waveguides such that in one of the positions of the phase shifting gate the beams between each pair of optical waveguides are transmitted through the light transmissive panel, and in a second position of the gate the light in the beams between the pairs of optical waveguides is substantially reflected by interference effects.

32. A micromechanical optical modulator comprising:
(a) an input optical waveguide with an exit face from which a light beam can exit the waveguide;
(b) an output optical waveguide with an entrance face, the output optical waveguide mounted adjacent to the input optical waveguide;
(c) a plate of light transmissive material mounted to receive a light beam exiting from the exit face of the input optical waveguide;
(d) a phase shifting gate mounted between the input and output optical waveguides and the plate, the phase shifting gate having a light transmissive panel having at least one section having outer surfaces, the phase shifting gate translatable between at least two positions, wherein in one of the positions of the gate the beam from the input optical waveguide is transmitted to the plate, and wherein in the other position of the gate the panel section is interposed in the beam path from the input optical waveguide to the plate, wherein the spacing between the exit face of the input optical waveguide and the adjacent outer surface of the section of the light transmissive panel, the spacing between the plate and the adjacent outer surface of the section of the light transmissive panel, and the index of refraction of the light transmissive panel are selected for a selected wavelength of light in a beam exiting from the exit face of the input optical waveguide such that in the position of the phase shifting gate in which the one section of the light transmissive panel is interposed in the beam path gate, the light in the beam is substantially reflected by interference effects to the entrance face of the output optical waveguide.

33. The optical modulator of claim 32 wherein the phase shifting gate has a light transmissive panel having at least two sections having outer surfaces, one thicker section having a thickness greater than that of another thinner section, wherein in one of the positions of the gate the thinner section of the light transmissive panel is interposed in the beam path between the input optical waveguide and the output optical waveguide and in the other position of the gate the thicker section is interposed in the beam path from the input optical waveguide to the output optical waveguide, wherein the spacing between the exit face of the input optical waveguide and the adjacent outer surfaces of the light transmissive panel in the thicker and thinner sections, the spacing between the light transmissive plate of the output and the adjacent outer surfaces of the thicker and thinner sections of the light transmissive panel, and the index of refraction of the light transmissive panel are selected for a selected wavelength of light in a beam exiting from the exit face of the input optical waveguide such that in one of the positions of the phase shifting gate the beam is transmitted through the light transmissive panel and in a second position of the gate, the light in the beam is substantially reflected by interference effects.

34. The optical modulator of claim 32 wherein the light transmissive panel of the gate and the light transmissive plate are formed of silicon.

35. A micromechanical optical modulator comprising:
(a) an input optical waveguide with an exit face from which a light beam can exit the waveguide;
(b) a plate of light transmissive material with a surface spaced from the exit face of the input optical waveguide to receive a light beam exiting from the exit face of the input optical waveguide on a beam path; and
(c) a phase shifting gate mounted between the input optical waveguide and the light transmissive plate, the phase shifting gate having a light transmissive panel having at least one section having outer surfaces, the phase shifting gate translatable between at least two positions, wherein in one of the positions of the gate the beam from the input optical waveguide is transmitted to the plate, and wherein in the other position of the gate the section is interposed in the beam path from the input optical waveguide to the plate, wherein the spacing between the exit face of the input optical waveguide and the adjacent outer surface of the section of the light transmissive panel, the spacing between the plate and the adjacent outer surface of the section of the light transmissive panel, and the index of refraction of the light transmissive panel are selected for a selected wavelength of light in a beam exiting from the exit face of the input optical waveguide such that in the position of the phase shifting gate in which the section of the light transmissive panel is interposed in the beam path, the light in the beam is substantially reflected by interference effects back to the exit face of the input optical waveguide.

36. The optical modulator of claim 35 wherein the phase shifting gate has a light transmissive panel having at least two sections having outer surfaces, one thicker section having a thickness greater than that of another thinner section, wherein in one of the positions of the gate the thinner section of the light transmissive panel is interposed in the beam path and in the other position of the gate the thicker section is interposed in the beam path, wherein the spacing between the exit face of the input optical waveguide and the adjacent outer surfaces of the light transmissive panel in the thicker and thinner sections, the spacing between the plate of light transmissive material and the adjacent outer surfaces of the thicker and thinner sections of the light transmissive panel, and the index of refraction of the light transmissive panel are selected for a selected wavelength of light in a beam exiting from the exit face of the input optical waveguide such that in one of the positions of the phase shifting gate the beam is transmitted through the light transmissive panel and in a second position of the gate, the light in the beam is substantially reflected by interference effects.

37. The optical modulator of claim 35 wherein the light transmissive panel of the gate is formed of silicon.

38. A micromechanical optical modulator accelerometer comprising:
(a) an input optical waveguide with an exit face from which a light beam can exit the waveguide;

(b) an output optical waveguide with an entrance face spaced from the exit face of the input optical waveguide to receive a light beam exiting from the exit face of the input optical waveguide on a beam path;

(c) a phase shifting gate mounted between the input optical waveguide and output optical waveguide, the phase shifting gate having a light transmissive panel having at least one section having outer surfaces, the phase shifting gate translatable between at least two positions, wherein in one of the positions of the gate the beam from the input optical waveguide is transmitted to the output optical waveguide, and wherein in the other position of the gate the section is interposed in the beam path from the input optical waveguide to the output optical waveguide, wherein the spacing between the exit face of the input optical waveguide and the adjacent outer surface of the section of the light transmissive panel, the spacing between the entrance face of the output optical waveguide and the adjacent outer surface of the section of the light transmissive panel, and the index of refraction of the light transmissive panel are selected for a selected wavelength of light in a beam exiting from the exit face of the input optical waveguide such that in the one position of the phase shifting gate in which the section of the light transmissive panel is interposed in the beam path, the light in the beam is substantially reflected by interference effects;

(d) a proof mass connected to the phase shifting gate; and (e) a support spring connected to the phase shifting gate to support the gate for lateral motion and to bias the gate back to a normal position, such that the proof mass will displace the phase shifting gate in response to acceleration.

39. The optical modulator accelerator of claim 38 wherein the phase shifting gate has a light transmissive panel having at least two sections having outer surfaces, one thicker section having a thickness greater than that of another thinner section, wherein in one of the positions of the gate the thinner section of the light transmissive panel is interposed in the beam path between the input optical waveguide and the output optical waveguide and in the other position of the gate the thicker section is interposed in the beam path from the input optical waveguide to the output optical waveguide, wherein the spacing between the exit face of the input optical waveguide and the adjacent outer surfaces of the light transmissive panel in the thicker and thinner sections, the spacing between the entrance face of the output optical waveguide and the adjacent outer surfaces of the thicker and thinner sections of the light transmissive panel, and the index of refraction of the light transmissive panel are selected for a selected wavelength of light in a beam exiting from the exit face of the input optical waveguide such that in one of the positions of the phase shifting gate the beam is transmitted through the light transmissive panel and in a second position of the gate, the light in the beam is substantially reflected by interference effects.

40. The optical modulator accelerometer of claim 39 wherein the phase shifting gate is mounted for translation perpendicularly to the beam path from the exit face of the input optical waveguide to the entrance face of the output optical waveguide, and wherein the surfaces of the thicker section and the thinner section of the light transmissive panel of the phase shifting gate are parallel to one another and to the exit face and to the entrance face, and wherein in a first position of the gate wherein one of the sections is in the beam path, for a beam having a selected wavelength $\lambda_0$, the spacing between the entrance face and the surface of the panel section adjacent to it and the spacing between the entrance face and the surface of the panel section adjacent to it are selected to be odd multiples of $\lambda_0/4n_{air}$, and the thickness of the one section between its surface is selected to be an odd multiple of $\lambda_0/4n_g$ to obtain maximum reflectivity, where $n_{air}$ is the index of refraction air and $n_g$ is the index of the refraction material of the transmissive panel, and in the other position of the gate the thickness of the other section of the gate between its surfaces which is now in the beam between the exit face and the entrance face is selected to be an even multiple of $\lambda_0/4n_g$ to obtain minimum reflectivity and maximum transmission through the gate.

41. The optical modulator accelerometer of claim 40 wherein the light transmissive panel of the gate is formed of silicon.

42. The optical modulator accelerometer of claim 38 wherein the light transmissive panel of the gate is formed of silicon.

43. The optical modulator accelerometer of claim 42 wherein the wavelength of light in the beam exiting from the exit face of the input waveguide is centered at 1.55 μm.

44. The optical modulator accelerometer of claim 38 wherein the spacing between the exit face of the input optical waveguide and the entrance face of the output optical waveguide is less than 1 mm.

45. The optical modulator accelerometer of claim 44 wherein the spacing between the exit face and the entrance face is less than 40 μm.

46. The optical modulator accelerometer of claim 38 wherein the light transmissive panel of the phase shifting gate is formed of silicon and including an interface plate formed of silicon secured to the exit face of the input waveguide and an interface plate of silicon secured to the entrance face of the output waveguide.

47. A method of modulating light in a light beam comprising:

(a) projecting light from an exit face of an input optical waveguide in a beam toward an entrance face of an output optical waveguide;

(b) interposing a first section of a panel of light transmissive material in the beam, the panel section having a selected thickness to transmit the light beam through the section to the entrance face of the output optical waveguide; and (c) interposing a second section of a panel of light transmissive material in the beam, the thickness of the second section, the index of refraction of the second section, and the spacing of surfaces of the second section from the exit face of the input optical waveguide and the entrance face of the output optical waveguide selected so as to reflect the light in the beam by interference effects.

48. The method of claim 47 wherein the sections of the panel interposed in the beam are part of a unitary panel having a first section of a first thickness between the surfaces of the section and a second adjacent section of a second greater thickness between the surfaces of the section of the panel, and wherein in the step of interposing a first section in the beam at a selected thickness to transmit the light beam the panel is translated to a position so that a first of the sections of the panel is in the beam and, in the step of interposing a panel in the beam to reflect the light, the panel is translated laterally to another position to bring the second of the sections of the panel into the beam.

49. The method of claim 48 wherein in the step of projecting light from the exit face of the input optical waveguide the light is projected at a wavelength centered at 1.55 μm, and wherein the panel is formed of silicon.

50. The method of claim 49 wherein the input optical waveguide and the output optical waveguide constitute a first input optical waveguide and a first output optical waveguide, and further including, projecting light from an exit face of a second input optical waveguide in a beam toward an entrance face of a second output optical waveguide, and wherein the panel of light transmissive material is interposed in the beam path between the second input optical waveguide and second output optical waveguide through a section of the panel of a different thickness than the thickness of the section of the panel through which light is projected from the first input optical waveguide to the first output optical waveguide.

51. A method of modulating a beam of light to switch the beam of light comprising:

(a) projecting light from an exit face of a first input optical waveguide in a beam toward the entrance face of a first output optical waveguide;

(b) providing a panel of material that is transmissive to the beam of light, the panel having at least two sections of two different thicknesses, and interposing a one of the sections of the panel in the beam between the exit face and the entrance face that is selected to transmit the beam through the section of the panel from the exit face of the input optical waveguide to the entrance face of the output optical waveguide;

(c) then interposing the second of the sections of the panel in the beam between the exit face of the first input optical waveguide and the first output optical waveguide, the second of the sections selected in thickness, index of refraction, and spacing from the exit face of the first input optical waveguide and the entrance face of the first output optical waveguide such that the beam is reflected by interference effects, and reflecting the beam to and receiving the beam by an entrance face of a second output optical waveguide to transmit the beam on the second output optical waveguide.

52. The method of claim 51 including providing a second input optical waveguide and projecting light from an exit face of the second input optical waveguide in a beam toward the entrance face of the second output optical waveguide, and wherein when the section of the panel is in the position to transmit the beam from the first input optical waveguide to the first output optical waveguide, the beam projected from the exit face of the second input optical waveguide is transmitted through the panel to and is received by the entrance face of the second output optical waveguide, and when the panel is in the position with the section of the panel reflecting light in the beam projected from the exit face of the first input optical waveguide the panel reflects the beam projected from the exit face of the second input optical waveguide and reflects the beam to the entrance face of the first output optical waveguide.

53. The method of claim 52 wherein the light transmissive panel is formed of silicon and the beam is projected from the exit face of the first input optical waveguide at a wavelength centered at 1.55 $\mu$m.

54. A method of modulating light in a light beam comprising:

(a) projecting light from an exit face of an input optical waveguide in a beam toward an entrance face of a light transmissive material, (b) transmitting the light beam from the exit face to the entrance face; and (c) interposing a section of a panel of light transmissive material in the beam, the thickness of the section, the index of refraction of the section, and the spacing of surfaces of the section from the exit face of the input optical waveguide and from the entrance face selected so as to reflect the light in the beam by interference effects.

55. The method of claim 54 wherein the section of the panel interposed in the beam is part of a unitary panel having a first section of a first thickness between the surfaces of the section and a second adjacent section of a second greater thickness between the surfaces of the section of the panel, and including the steps of interposing a first section in the beam at a selected thickness to transmit the light beam through the first section by translating the panel to a position in which the first of the sections of the panel is in the beam and, in the step of interposing a panel in the beam to reflect the light, the panel is translated laterally to another position to bring the second of the sections of the panel into the beam.

56. The method of claim 55 wherein in the step of projecting light from the exit face of the input optical waveguide the light is projected at a wavelength centered at 1.55 $\mu$m, and wherein the panel is formed of silicon.

* * * * *

UNITED STATES PATENT AND TRADEMARK OFFICE
CERTIFICATE OF CORRECTION

PATENT NO. : 6,377,718 B1
DATED : April 23, 2002
INVENTOR(S) : Long Que et al.

It is certified that error appears in the above-identified patent and that said Letters Patent is hereby corrected as shown below:

Column 7,
Line 37, of the issued patent, "$\tau_0=5$" should be replaced with -- $\sigma_0=5$ --.

Column 15,
Line 2, of the issued patent, "$X_0$" should be replaced with -- $\lambda_0$ --.

Signed and Sealed this

Eighth Day of October, 2002

Attest:

Attesting Officer

JAMES E. ROGAN
Director of the United States Patent and Trademark Office